US012571213B2

(12) United States Patent
Tibah et al.

(10) Patent No.:  US 12,571,213 B2
(45) Date of Patent:  Mar. 10, 2026

(54) ASPHALT SHINGLE WASTE-FILLED POLYMER-MODIFIED ASPHALT COATINGS AND RELATED SYSTEMS AND RELATED METHODS

(71) Applicant: BMRC LLC, Wilmington, DE (US)

(72) Inventors: Denis Muki Tibah, Waxahachie, TX (US); Ann Hamer, Waxahachie, TX (US); Steven Sparks, Midlothian, TX (US); Xiangnan Ye, Cypress, TX (US)

(73) Assignee: BMRC LLC, Wilmington, DE (US)

( * ) Notice: Subject to any disclaimer, the term of this patent is extended or adjusted under 35 U.S.C. 154(b) by 0 days.

(21) Appl. No.: 18/782,889

(22) Filed: Jul. 24, 2024

(65) Prior Publication Data

US 2025/0034874 A1     Jan. 30, 2025

Related U.S. Application Data

(60) Provisional application No. 63/515,196, filed on Jul. 24, 2023.

(51) Int. Cl.

| | |
|---|---|
| *E04D 1/26* | (2006.01) |
| *C08L 53/02* | (2006.01) |
| *C08L 95/00* | (2006.01) |
| *E04D 1/00* | (2006.01) |
| *E04D 1/20* | (2006.01) |

(52) U.S. Cl.
CPC ................ *E04D 1/26* (2013.01); *C08L 53/02* (2013.01); *C08L 95/00* (2013.01); *E04D 1/20* (2013.01); *C08L 2207/22* (2013.01); *E04D 2001/005* (2013.01)

(58) Field of Classification Search
CPC ....... E04D 1/26; E04D 1/20; E04D 2001/005; C08L 53/02; C08L 95/00; C08L 2207/22
See application file for complete search history.

(56) References Cited

U.S. PATENT DOCUMENTS

| | | | |
|---|---|---|---|
| 3,026,568 | A | 3/1962 | Moar |
| 5,209,802 | A | 5/1993 | Hannah et al. |
| 5,718,787 | A | 2/1998 | Gallagher et al. |
| 6,441,065 | B1 | 8/2002 | Chevillard et al. |
| 6,497,930 | B1 | 12/2002 | Petermeier |
| 6,743,313 | B2 | 6/2004 | Mischo |
| 6,984,670 | B2 | 1/2006 | Meyers, III et al. |
| 7,052,635 | B2 | 5/2006 | Mischo |
| 7,202,290 | B2 | 4/2007 | Stuart et al. |

(Continued)

FOREIGN PATENT DOCUMENTS

| | | |
|---|---|---|
| WO | 2018/091769 A1 | 5/2018 |
| WO | 2018/094315 A2 | 5/2018 |

(Continued)

*Primary Examiner* — Nathan L Van Sell
(74) *Attorney, Agent, or Firm* — GREENBERG TRAURIG, LLP

(57) ABSTRACT

Roofing shingles are provided herein. A roofing shingle comprises a substrate, an asphalt filled coating on the substrate, and granules on the asphalt filled coating. The asphalt filled coating comprises an asphalt, a polymer modifier, at least 50% by weight of an asphalt shingle waste based on a total weight of the asphalt filled coating, and 40% by weight or less of at least one filler based on the total weight of the asphalt coating. Roofing systems and related methods are also provided herein.

19 Claims, 6 Drawing Sheets

100

(56) References Cited

U.S. PATENT DOCUMENTS

| | | | |
|---|---|---|---|
| 7,297,301 B1 | 11/2007 | Deschamps et al. | |
| 7,487,931 B2 | 2/2009 | Monyak | |
| D588,057 S | 3/2009 | Soler | |
| 7,758,686 B2 | 7/2010 | Michel | |
| 7,891,590 B2 | 2/2011 | Rasmussen | |
| 7,900,266 B1 | 3/2011 | Logoor | |
| 7,913,940 B2 | 3/2011 | Harmon | |
| 7,951,417 B1 | 5/2011 | Wen et al. | |
| 8,034,172 B2 | 10/2011 | Naidoo et al. | |
| D649,510 S | 11/2011 | Christensen et al. | |
| D649,511 S | 11/2011 | Christensen et al. | |
| 8,083,166 B2 | 12/2011 | Gould et al. | |
| 8,162,242 B2 | 4/2012 | Hofmann et al. | |
| 8,177,152 B2 | 5/2012 | Harmon | |
| 8,186,610 B2 | 5/2012 | Gould et al. | |
| 8,192,539 B2 | 6/2012 | Barger et al. | |
| 8,198,350 B2 | 6/2012 | Fee et al. | |
| 8,210,458 B2 | 7/2012 | Strasser et al. | |
| 8,266,861 B2 | 9/2012 | Koch et al. | |
| 8,298,331 B2 | 10/2012 | Ribeiro | |
| 8,382,362 B2 | 2/2013 | Omann | |
| 8,388,873 B2 | 3/2013 | Hofmann et al. | |
| 8,444,759 B2 | 5/2013 | Wen et al. | |
| 8,490,338 B2 | 7/2013 | Longo | |
| 8,496,196 B2 | 7/2013 | Zickell et al. | |
| 8,672,248 B2 | 3/2014 | Zickell et al. | |
| 8,673,427 B2 | 3/2014 | Kalkanoglu et al. | |
| 8,783,590 B2 | 7/2014 | Zickell et al. | |
| 8,784,554 B2 | 7/2014 | Naidoo et al. | |
| 8,789,773 B2 | 7/2014 | Teeter, Jr. et al. | |
| 8,821,064 B1 | 9/2014 | Morris | |
| 8,919,681 B1 | 12/2014 | Horton et al. | |
| 8,940,360 B1 | 1/2015 | Brasier et al. | |
| 9,115,284 B2 | 8/2015 | Davis et al. | |
| 9,156,035 B1 | 10/2015 | Horton et al. | |
| 9,227,196 B2 | 1/2016 | Hassan et al. | |
| 9,273,228 B1 | 3/2016 | Hyer et al. | |
| 9,279,255 B2 | 3/2016 | Bryson et al. | |
| 9,295,992 B2 | 3/2016 | Zickell | |
| 9,382,423 B2 | 7/2016 | Bolton et al. | |
| 9,440,239 B1 | 9/2016 | Horton et al. | |
| 9,457,354 B2 | 10/2016 | Svec et al. | |
| 9,458,320 B2 | 10/2016 | Blyth et al. | |
| 9,493,633 B2 | 11/2016 | Rowland et al. | |
| 9,493,653 B2 | 11/2016 | Rowe et al. | |
| 9,550,311 B1 | 1/2017 | Neel | |
| 9,605,152 B2 | 3/2017 | Ruan et al. | |
| 9,637,615 B2 | 5/2017 | Fini | |
| 9,745,472 B2 | 8/2017 | Salmonsen et al. | |
| 9,765,280 B2 | 9/2017 | Kurth et al. | |
| 9,790,360 B2 | 10/2017 | Puchalski et al. | |
| 9,834,895 B2 | 12/2017 | Neel | |
| 9,855,677 B2 | 1/2018 | Brock et al. | |
| 9,856,377 B1 | 1/2018 | Krivohlavek | |
| 9,862,861 B2 | 1/2018 | Boddy et al. | |
| 9,926,102 B2 | 3/2018 | Baker et al. | |
| D815,026 S | 4/2018 | Hunter, III | |
| 9,944,796 B1 | 4/2018 | Grzybowski | |
| 9,951,223 B2 | 4/2018 | Gillespie et al. | |
| 9,951,224 B2 | 4/2018 | Russell | |
| 9,963,837 B1 | 5/2018 | Gilpin et al. | |
| 9,994,485 B2 | 6/2018 | Warner et al. | |
| 10,018,986 B2 | 7/2018 | Richard | |
| 10,030,338 B2 | 7/2018 | Dempsey et al. | |
| 10,060,085 B2 | 8/2018 | Christian | |
| 10,076,759 B1 | 9/2018 | Christian | |
| 10,077,356 B2 | 9/2018 | Fini | |
| 10,155,866 B2 | 12/2018 | Le et al. | |
| 10,190,265 B2 | 1/2019 | Dempsey et al. | |
| 10,196,585 B2 | 2/2019 | Kurth et al. | |
| 10,196,783 B2 | 2/2019 | Dempsey et al. | |
| 10,214,364 B2 | 2/2019 | Grathwol | |
| 10,288,349 B2 | 5/2019 | Swanson | |
| 10,294,616 B2 | 5/2019 | Crupi et al. | |
| 10,316,189 B2 | 6/2019 | Kurth et al. | |
| 10,316,190 B2 | 6/2019 | Kurth et al. | |
| 10,316,192 B2 | 6/2019 | Kurth et al. | |
| 10,323,149 B2 | 6/2019 | Russell | |
| 10,329,426 B2 | 6/2019 | Kurth et al. | |
| 10,336,906 B2 | 7/2019 | Lewandowski et al. | |
| 10,337,153 B2 | 7/2019 | Hoffman et al. | |
| 10,358,588 B2 | 7/2019 | Subotic et al. | |
| 10,416,057 B2 | 9/2019 | Mohseni | |
| 10,485,381 B2 | 11/2019 | Fortmann et al. | |
| 10,550,574 B2 | 2/2020 | Hong et al. | |
| 10,611,938 B2 | 4/2020 | Croteau et al. | |
| 10,669,203 B2 * | 6/2020 | Franzen | C04B 26/26 |
| 10,683,620 B1 | 6/2020 | Kelley et al. | |
| 10,697,133 B1 | 6/2020 | Kelley et al. | |
| 10,858,790 B1 | 12/2020 | Kelley et al. | |
| 11,059,976 B2 | 7/2021 | Franzen et al. | |
| 11,286,360 B2 | 3/2022 | Shiao et al. | |
| D955,526 S | 6/2022 | Hossack | |
| 11,401,449 B2 | 8/2022 | Kelley et al. | |
| 2002/0066813 A1 | 6/2002 | Mischo | |
| 2008/0184661 A1 | 8/2008 | Lombard | |
| 2008/0314803 A1 | 12/2008 | Burke | |
| 2010/0064937 A1 | 3/2010 | Harmon et al. | |
| 2010/0307380 A1 | 12/2010 | Fader | |
| 2011/0041731 A1 | 2/2011 | Lombard | |
| 2011/0233105 A1 | 9/2011 | Bailey | |
| 2013/0199410 A1 | 8/2013 | Maldonado et al. | |
| 2013/0220175 A1 | 8/2013 | Zickell | |
| 2013/0307172 A1 | 11/2013 | Seder et al. | |
| 2013/0313344 A1 | 11/2013 | Nykulin et al. | |
| 2014/0014000 A1 | 1/2014 | Franzen et al. | |
| 2014/0299018 A1 | 10/2014 | Elseifi et al. | |
| 2014/0331897 A1 | 11/2014 | Elseifi | |
| 2014/0373749 A1 | 12/2014 | Zickell et al. | |
| 2015/0252534 A1 | 9/2015 | Dempsey et al. | |
| 2016/0362338 A1 | 12/2016 | Reinke et al. | |
| 2016/0362339 A1 | 12/2016 | Franzen et al. | |
| 2018/0030276 A1 | 2/2018 | De Garavilla et al. | |
| 2018/0141866 A1 | 5/2018 | Kotefski et al. | |
| 2018/0186963 A1 | 7/2018 | Kotefski et al. | |
| 2018/0208771 A1 | 7/2018 | Gillespie et al. | |
| 2018/0243798 A1 | 8/2018 | Abraham et al. | |
| 2018/0334620 A1 | 11/2018 | Kotefski et al. | |
| 2019/0039105 A1 | 2/2019 | Burns, Sr. et al. | |
| 2019/0093344 A1 * | 3/2019 | Benensky | B32B 3/26 |
| 2019/0186144 A1 * | 6/2019 | LaTorre | B32B 11/02 |
| 2019/0300427 A1 | 10/2019 | Horton | |
| 2019/0375940 A1 | 12/2019 | Franzen et al. | |
| 2020/0325071 A1 * | 10/2020 | Franzen | E04D 1/20 |
| 2021/0087443 A1 * | 3/2021 | Kelley | C09J 5/00 |
| 2021/0171774 A1 * | 6/2021 | Tibah | C08L 95/00 |
| 2023/0174869 A1 | 6/2023 | Horton | |

FOREIGN PATENT DOCUMENTS

| | | |
|---|---|---|
| WO | 2018/125952 A1 | 7/2018 |
| WO | 2019/134729 A1 | 7/2019 |
| WO | 2009/150519 A2 | 8/2019 |

* cited by examiner

100

104

102

106

304     308

ASPHALT SHINGLE WASTE-FILLED POLYMER-MODIFIED ASPHALT COATINGS AND RELATED SYSTEMS AND RELATED METHODS

CROSS-REFERENCE TO RELATED APPLICATIONS

This application claims priority to U.S. Provisional Patent Application No. 63/515,196, filed Jul. 24, 2023, and titled "ASPHALT SHINGLE WASTE-FILLED POLYMER-MODIFIED ASPHALT COATINGS AND RELATED SYSTEMS AND RELATED METHODS," the disclosure of which application is hereby incorporated herein by reference in their entirety.

FIELD

This disclosure generally relates to asphalt shingle waste-filled asphalt coatings and related systems and related methods.

BACKGROUND

Approximately 11 million tons of asphalt shingle waste (ASW) are generated in the U.S. each year. Asphalt shingle waste can take time to decompose in a landfill.

SUMMARY

Some embodiments relate to a roofing shingle. In some embodiments, the roofing shingle comprises a substrate. In some embodiments, the roofing shingle comprises an asphalt coating on the substrate. In some embodiments, the asphalt coating comprises an asphalt. In some embodiments, the asphalt coating comprises a polymer modifier. In some embodiments, the asphalt coating comprises at least 50% by weight of an asphalt shingle waste based on a total weight of the asphalt coating. In some embodiments, the asphalt shingle waste is present in an amount sufficient for the roofing shingle to exhibit, when tested according to a three-point bending test at a constant rate of 100 microns per second and a temperature of 20° C., an axial force of 25 N or less at a displacement of 0.1 mm to 10 mm. In some embodiments, the asphalt coating comprises 40% by weight or less of at least one filler based on the total weight of the asphalt coating. In some embodiments, the roofing shingle comprises granules on the asphalt coating.

In some embodiments, the asphalt coating comprises 1% to 50% by weight of the asphalt based on the total weight of the asphalt coating. In some embodiments, the asphalt coating comprises 1% to 20% by weight of the polymer modifier based on the total weight of the asphalt coating. In some embodiments, the asphalt coating comprises 50% to 95% by weight of the asphalt shingle waste based on the total weight of the asphalt coating.

In some embodiments, the asphalt coating comprises 5% to 50% by weight of the asphalt and the polymer modifier based on the total weight of the asphalt coating. In some embodiments, the asphalt coating comprises 50% to 95% by weight of the asphalt shingle waste based on the total weight of the asphalt coating.

In some embodiments, the asphalt coating comprises 50% to 99% by weight of the asphalt based on a total weight of the asphalt and the polymer modifier. In some embodiments, the asphalt coating comprises 1% to 50% by weight of the polymer modifier based on the total weight of the asphalt and the polymer modifier.

In some embodiments, the asphalt coating comprises 80% to 99% by weight of the asphalt based on a total weight of the asphalt and the polymer modifier. In some embodiments, the asphalt coating comprises 1% to 20% by weight of the polymer modifier based on the total weight of the asphalt and the polymer modifier.

In some embodiments, the asphalt comprises an oxidized asphalt.

In some embodiments, the polymer modifier comprises at least one of a poly(styrene-butadiene-styrene) (SBS), a poly(styrene-ethylene/butylene-styrene) (SEBS), a poly(styrene-isoprene-styrene) (SIS), an atactic polypropylene (APP), an isotactic polypropylene (IPP), a low-density polyethylene (LDPE), medium-density polyethylene (MDPE), high-density polyethylene (HDPE), a polypropylene, an acrylic, a polyvinyl siloxane (PVS), any copolymer thereof, or any combination thereof.

In some embodiments, the asphalt shingle waste comprises 5% to 50% by weight of a waste asphalt based on a total weight of the asphalt shingle waste. In some embodiments, the asphalt shingle waste comprises 50% to 95% by weight of a limestone, granules, or impurities based on the total weight of the asphalt shingle waste.

In some embodiments, the asphalt coating comprises 1% to 40% by weight of the at least one filler based on the total weight of the asphalt coating.

In some embodiments, the asphalt coating is substantially free of the at least one filler.

In some embodiments, the asphalt coating is free of the at least one filler.

In some embodiments, the roofing shingle exhibits, when tested according to a three-point bending test at a constant rate of 100 microns per second and a temperature of 20° C., an axial force of 25 N or less at a displacement of 0.1 mm to 10 mm.

In some embodiments, the roofing shingle exhibits, when tested according to a three-point bending test at a constant rate of 100 microns per second and a temperature of 20° C., an axial force of 2 N to 25 N at a displacement of 0.1 mm to 10 mm.

In some embodiments, the asphalt coating has a penetration point of 15 dmm to 45 dmm as measured according to ASTM D-5.

In some embodiments, the asphalt coating has a softening point of 190° F. to 250° F. as measured according to ASTM D-3461.

Some embodiments relate to a roofing system. In some embodiments, the roofing system comprises a roofing substrate. In some embodiments, the roofing system comprises at least one roofing shingle. In some embodiments, the at least one roofing shingle is located on the roofing substrate. In some embodiments, the at least one roofing shingle comprises a substrate. In some embodiments, the at least one roofing shingle comprises an asphalt coating on the substrate. In some embodiments, the asphalt coating comprises an asphalt. In some embodiments, the asphalt coating comprises a polymer modifier. In some embodiments, the asphalt coating comprises at least 50% by weight of an asphalt shingle waste based on a total weight of the asphalt coating. In some embodiments, the asphalt coating comprises 40% by weight or less of at least one filler based on the total weight of the asphalt coating. In some embodiments, the at least one roofing shingle comprises granules on the asphalt coating.

In some embodiments, the roofing substrate comprises at least one of a plywood substrate, a glass substrate, a cellulosic substrate, a roof shingle, a mat, a fabric, a glass mat, a fiberglass mat, an underlayment, a roofing membrane, a roof deck, a photovoltaic (PV) panel, a modified bitumen (MODBIT) substrate, a roll good, a polyisocyanurate (ISO) foam board, a cover board, a pipe, a base sheet, a chimney, a wax paper, or any combination thereof.

In some embodiments, the at least one roofing shingle directly contacts the roofing substrate.

In some embodiments, the asphalt coating comprises 1% to 50% by weight of the asphalt based on the total weight of the asphalt coating. In some embodiments, the asphalt coating comprises 1% to 20% by weight of the polymer modifier based on the total weight of the asphalt coating. In some embodiments, the asphalt coating comprises 50% to 95% by weight of the asphalt shingle waste based on the total weight of the asphalt coating.

In some embodiments, the asphalt coating is substantially free of the at least one filler.

BRIEF DESCRIPTION OF THE DRAWINGS

Reference is made to the drawings that form a part of this disclosure, and which illustrate embodiments in which the materials and methods described herein can be practiced.

DETAILED DESCRIPTION

Figure 1:
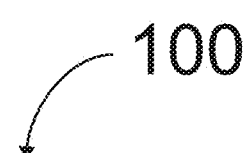
FIG. 1 is a schematic diagram of a roofing material, according to some embodiments.

As used herein, the term "asphalt shingle waste" refers to any form of discarded asphalt shingle. In some embodiments, the asphalt shingle waste is provided in a form of at least one of a briquette, a powder, a pellet, or any combination thereof. "Asphalt shingle waste" includes, but is not limited to, post-manufacturing waste and post-consumer waste.

As used herein, the term "post-consumer waste" refers to any waste produced by an end consumer of a material stream. A non-limiting example of "post-consumer waste" is a discarded roofing shingle from a residential or commercial roof. Another non-limiting example of "post-consumer waste" is contractor waste including, but not limited to, surplus new material, damaged material, and scrap from cut shingles during installation. Yet another non-limiting example of "post-consumer waste" is at least one of: distributor waste, retail waste, or any combination thereof, including, but not limited to, damaged shingle products, aged inventory of shingles, and customer returns.

As used herein, the term "post-manufacturing waste" refers to waste produced prior to reaching the end consumer of a material stream. A non-limiting example of "post-manufacturing waste" is any shingle waste generated during the production, handling, transportation or other method of generation prior to installation on a roof of a consumer. Post-manufacturing waste may include production waste such as, but not limited to, partial shingles and coated fiberglass mat with or without granules.

As used herein, the term "waste asphalt" refers to any form of asphalt that is obtained from asphalt shingle waste.

As used herein, the term "asphalt," when used without the modifier "waste," refers to any form of asphalt that is not obtained from asphalt shingle waste (e.g., a non-waste asphalt). For example, in some embodiments, an asphalt comprises at least one of a product of petroleum refining, a product of atmospheric distillation, a product of vacuum distillation, a product of a solvent de-asphalting unit, a residue of a vacuum tower bottoms (VTB), a product of a recycled asphalt stream (e.g., re-refined engine oil bottoms), a product of a recycled asphalt process, a product of direct distillation of petroleum, a product of propane deasphalting of petroleum fractions, or any combination thereof. In some embodiments, the asphalt comprises a non-waste asphalt, such as, for example and without limitation, at least one of hot mix asphalt, warm mix asphalt, cold mix asphalt, sheet asphalt, high-modulus asphalt, or any combination thereof.

As used herein, the term "oxidized asphalt" refers to an asphalt that is (or has been) subjected to an oxidation or air blowing process. For example, in some embodiments, an oxidized asphalt refers to an asphalt that is (or has been) subjected to air blowing sufficient to undergo oxidation. A non-limiting example of an oxidation procedure is one in which air is blown into an asphalt at a sufficient temperature (e.g., from 450° F. to 500° F.) to oxidize the asphalt. Other non-limiting examples of oxidation procedures are described in U.S. Pat. Nos. 7,901,563 and 9,556,383, each of which are incorporated by reference in their entireties.

As used herein, the term "unoxidized asphalt" refers to an asphalt that is not (or has not been) subjected to an oxidation or air blowing process. For example, in some embodiments, an unoxidized asphalt refers to an asphalt that is not (or has not been) subjected to air blowing sufficient to undergo oxidation.

As used herein, the term "polymer modified asphalt" refers to a composition comprising an asphalt and a polymer modifier. A non-limiting example of a polymer modification procedure is mechanical blending, in which at least one polymer is mixed with an asphalt at a sufficient temperature (e.g., from 250° F. to 350° F.) to form a polymer-modified asphalt. Other non-limiting examples of polymer modification procedures are described in U.S. Pat. No. 8,901,211, which is incorporated by reference in its entirety. In yet other embodiments, the polymer forms a colloid suspension, colloid solution, or dispersion with the asphalt.

As used herein, the term "virgin filler" refers to a filler material that is not obtained from asphalt shingle waste. In some embodiments, the term "at least one filler" refers to the virgin filler. Non-limiting examples of filler materials, which, when not obtained from asphalt shingle waste, are virgin filler materials, include, without limitation, at least one of limestone, glass, calcium carbonate, barium sulfate, calcium sulfate, talc, perlite, silica, fumed silica, precipitated silica, quartz, aluminum trihydrate, magnesium hydroxide, ammonium polyphosphate, colemanite, titanium dioxide, calcium sulfate, fly ash, graphene nanoparticles, carbon black, recycled rubber tires, recycled thermoplastic resins, basalt, roofing granules, graphite, clay, or any combination thereof. In some embodiments, the roofing materials are substantially free of at least one virgin filler. In some embodiments, the roofing materials are free of at least one virgin filler. In some embodiments, the roofing materials do not comprise any virgin filler. In some embodiments, the roofing materials do not comprise virgin filler, wherein the virgin filler comprises at least limestone.

As used herein, the term "substantially free of a virgin filler" refers to a coating comprising 5% by weight or less of the virgin filler. The term includes coatings comprising no virgin filler. In some embodiments, a coating comprises an asphalt shingle waste, a polymer-modified asphalt, and a virgin filler. In some of these embodiments, the weight percentage of the virgin filler is based on a total weight of the coating. In some embodiments in which a coating is substantially free of the virgin filler, the coating may comprise 1% to 5% by weight of the virgin filler based on the total weight of the coating. In some embodiments, the coating does not comprise the virgin filler.

As used herein, the term "free of a virgin filler" refers to a coating comprising 1% by weight or less of the virgin filler. The term includes coatings comprising no virgin filler. In some embodiments, a coating comprises an asphalt shingle waste, a polymer-modified asphalt, and a virgin filler. In some of these embodiments, the weight percentage of the virgin filler is based on a total weight of the coating. In some embodiments in which a coating is free of the virgin filler, the coating may comprise 0.1% to 1% by weight of the virgin filler based on the total weight of the coating. In some embodiments, the coating does not comprise the virgin filler.

As used herein, the term "penetration point" or "pen" refers to a vertical distance penetrated by a point of a standard needle into asphalt under specific conditions of load, time, and temperature. In some embodiments, a penetration point is measured at 77° F. according to ASTM D5.

As used herein, the term "softening point" refers to the temperature at which a material softens beyond a predetermined reference softness. In some embodiments, softening point is measured herein according to ASTM D3461.

As used herein, the term "viscosity" refers to a measure of a fluid's resistance to flow at a given shear rate and temperature. Viscosity is measured herein in accordance with ASTM D-4402. In some embodiments, the viscosity is measured in accordance with ASTM D-4402 by using a Brookfield LVT viscometer at 400° F. with a #31 spindle at 30 RPM.

Some embodiments relate to roofing materials in which asphalt shingle waste is combined with a polymer-modified asphalt. In some embodiments, the asphalt shingle waste is used to replace at least a portion of a virgin filler, such as, for example and without limitation, limestone. In some embodiments, at least one advantage is that an asphalt shingle waste filled coating is achieved, without the use of a virgin filler or with at least reduced levels of a virgin filler, having same or similar properties to conventional air blown (e.g., oxidized) asphalt filled coatings, as well as to conventional polymer-modified asphalt filled coatings comprising a virgin filler. In some embodiments, at least another advantage is that the resulting asphalt shingle waste filled coatings exhibit improved flexibility, ductility, and viscoelastic behavior. In some embodiments, the improvements in viscoelastic behavior results in a roofing material (e.g., a roofing shingle) that is more pliable than a roofing shingle comprising a conventional air blown asphalt filled coating with virgin filler. In some embodiments, the resulting asphalt shingle waste filled coatings can be prepared with high loadings of asphalt shingle waste. In some embodiments, at least another advantage of the resulting asphalt shingle waste filled coatings is that the asphalt shingle waste filled coatings can be manufactured on a substantially standard manufacturing line for asphaltic shingles. These shall not be limiting, as other advantages of this disclosure will become apparent from the disclosure herein.

In some embodiments, the roofing material is at least one of a roofing shingle, a roofing membrane, a roofing substrate, a roofing accessory, or any combination thereof.

In some embodiments, the roofing membrane is a waterproofing membrane. In some embodiments, the roofing material comprises a roofing shingle. In some embodiments, the roofing shingle is a laminated roofing shingle. In some embodiments, the roofing shingle is a strip shingle. In some embodiments, for example, the roofing shingle is a three-tab strip shingle. In some embodiments, the roofing shingle exhibits improved impact resistance relative to a conventional roofing shingle comprising a conventional air blown asphalt filled coating with virgin filler. In some embodiments, the asphalt filled coatings are used in paving applications, such as, for example and without limitation, paving grade asphalt, sealants, and the like.

In some embodiments, the roofing material comprises a substrate. In some embodiments, the substrate comprises at least one of a mesh, a fabric, a fleece, a mat (e.g., a fiberglass mat, a polyester mat, etc.), a scrim, a coated scrim, a woven, a non-woven, or any combination thereof. In some embodiments, the substrate comprises at least one of an asphaltic substrate, a plywood substrate, a glass substrate, a cellulosic substrate, an underlayment, a roofing membrane (reinforced or unreinforced), a roof deck, a photovoltaic (PV) panel, a modified bitumen (MODBIT) substrate, an oriented strand board (OSB), a roll good, a board (such as but not limited to at least one of a foam board (e.g., a polyisocyanurate (ISO) foam board), a cover board, or any combination thereof), a fire retardant board, a hail resistant board, a high density cover board, a cement board, concrete, a base sheet, a pipe, a chimney, a wax paper, a mat, a fabric, a glass mat, a fiberglass mat, a woven mat, a nonwoven a fabric, a polyester mat, a scrim, a coated scrim, or any combination thereof.

In some embodiments, the roofing material comprises an asphalt filled coating. In some embodiments, the asphalt filled coating is located on at least a portion of at least one surface of the substrate. In some embodiments, the asphalt filled coating is located on at least a portion of at least one surface of the substrate. In some embodiments, the asphalt filled coating contacts at least a portion of at least one surface of the substrate. In some embodiments, the asphalt filled coating covers at least a portion of at least one surface of the substrate. In some embodiments, the asphalt filled coating impregnates at least a portion of at least one surface of the substrate. In some embodiments, the asphalt filled coating is pressed into at least a portion of at least one surface of the substrate. In some embodiments, an intervening layer is located between the asphalt filled coating and the substrate. In some embodiments, the asphalt filled coating is located on at least a portion of a first surface of the substrate and at least a portion of a second surface of the substrate, wherein the second surface is opposite the first surface.

In some embodiments, the asphalt filled coating comprises an asphalt. In some embodiments, the asphalt filled coating comprises at least one of a virgin asphalt, an oxidized asphalt, an unoxidized asphalt, a polymer-modified asphalt, a waste asphalt, or any combination thereof.

In some embodiments, the asphalt filled coating comprises a polymer modifier. In some embodiments, the polymer modifier comprises at least one of a linear polymer, a radial polymer, a linear copolymer, a radial copolymer, or any combination thereof. In some embodiments, the polymer modifier comprises at least one of a poly(styrenebutadiene-styrene) (SBS), a poly(styrene-ethylene/butylene-styrene) (SEBS), a styrene-butadiene rubber (SBR), a styrene-butadiene rubber latex, a polypropylene, a polyethylene, an atactic polypropylene (APP), an isotactic polypropylene (IPP), a low-density polyethylene (LDPE), a medium-density polyethylene (MDPE), a high-density polyethylene (HDPE), a chloroprene rubber (CR), a butadiene rubber (BR), an acrylonitrile-butadiene rubber (NBR), an isoprene rubber (IR), a poly(styrene-isoprene-styrene) (SIS), a styrene-polyisoprene polymer, a butyl rubber, an ethylene propylene rubber, a polyisobutylene (PIB), a chlorinated polyethylene (CPE), an ethylene-styrene-interpolymer (ESI), an acrylic polymer, a polyvinyl siloxane (PVS), a polystyrene, a polyurethane, a polyvinylchloride, a polyisocyanurate, a poly(acrylic acid), a polyester, an ethylene-vinyl acetate (EVA) copolymer, a Fischer-Tropsch wax, a terpolymer, any copolymer thereof, or any combination thereof. In some embodiments, the polymer modifier comprises at least one of a styrenic polymer, a styrenic copolymer (e.g., a styrenic block copolymer), or any combination thereof.

In some embodiments, the asphalt filled coating comprises an asphalt shingle waste. In some embodiments, the asphalt shingle waste comprises at least one of a waste asphalt, limestone, granules, impurities, or any combination thereof. In some embodiments, the impurities of the asphalt shingle waste comprise at least one of fiberglass mat, sand, fines, marker paint, sealant, at least one adhesive, tape, plastic debris, paper debris, soil, woods, nails, or any combination thereof. In some embodiments, the asphalt shingle waste is the non-waste asphalt portion of the asphalt shingle waste. For example, in some embodiments, the non-waste asphalt portion of the asphalt shingle waste is a portion of the asphalt shingle waste that does not comprise the waste asphalt. That is, in some embodiments, the non-waste asphalt portion of the asphalt shingle waste does not comprise a waste asphalt. For example, in some embodiments, the non-waste asphalt portion of the asphalt shingle waste comprises at least one of limestone, granules, impurities, or any combination thereof.

In some embodiments, the asphalt shingle waste comprises 5% to 50% by weight of a waste asphalt based on a total weight of the asphalt shingle waste. In some embodiments, the asphalt shingle waste comprises 10% to 50% by weight of the waste asphalt based on the total weight of the asphalt shingle waste. In some embodiments, the asphalt shingle waste comprises 15% to 50% by weight of the waste asphalt based on the total weight of the asphalt shingle waste. In some embodiments, the asphalt shingle waste comprises 20% to 50% by weight of the waste asphalt based on the total weight of the asphalt shingle waste. In some embodiments, the asphalt shingle waste comprises 25% to 50% by weight of the waste asphalt based on the total weight of the asphalt shingle waste. In some embodiments, the asphalt shingle waste comprises 30% to 50% by weight of the waste asphalt based on the total weight of the asphalt shingle waste. In some embodiments, the asphalt shingle waste comprises 35% to 50% by weight of the waste asphalt based on the total weight of the asphalt shingle waste. In some embodiments, the asphalt shingle waste comprises 40% to 50% by weight of the waste asphalt based on the total weight of the asphalt shingle waste. In some embodiments, the asphalt shingle waste comprises 45% to 50% by weight of the waste asphalt based on the total weight of the asphalt shingle waste.

In some embodiments, the asphalt shingle waste comprises 5% to 45% by weight of the waste asphalt based on the total weight of the asphalt shingle waste. In some embodiments, the asphalt shingle waste comprises 5% to 40% by weight of the waste asphalt based on the total weight of the asphalt shingle waste. In some embodiments, the asphalt shingle waste comprises 5% to 35% by weight of the waste asphalt based on the total weight of the asphalt shingle waste. In some embodiments, the asphalt shingle waste comprises 5% to 30% by weight of the waste asphalt based on the total weight of the asphalt shingle waste. In some embodiments, the asphalt shingle waste comprises 5% to 25% by weight of the waste asphalt based on the total weight of the asphalt shingle waste. In some embodiments, the asphalt shingle waste comprises 5% to 20% by weight of the waste asphalt based on the total weight of the asphalt shingle waste. In some embodiments, the asphalt shingle waste comprises 5% to 15% by weight of the waste asphalt based on the total weight of the asphalt shingle waste. In some embodiments, the asphalt shingle waste comprises 5% to 10% by weight of the waste asphalt based on the total weight of the asphalt shingle waste.

In some embodiments, the asphalt shingle waste comprises 50% to 95% by weight of at least one of a limestone, granules, impurities, or any combination thereof, based on the total weight of the asphalt shingle waste. In some embodiments, the asphalt shingle waste comprises 55% to 95% by weight of at least one of the limestone, granules, impurities, or any combination thereof, based on the total weight of the asphalt shingle waste. In some embodiments, the asphalt shingle waste comprises 60% to 95% by weight of at least one of the limestone, granules, impurities, or any combination thereof, based on the total weight of the asphalt shingle waste. In some embodiments, the asphalt shingle waste comprises 65% to 95% by weight of at least one of the limestone, granules, impurities, or any combination thereof, based on the total weight of the asphalt shingle waste. In some embodiments, the asphalt shingle waste comprises 70% to 95% by weight of at least one of the limestone, granules, impurities, or any combination thereof, based on the total weight of the asphalt shingle waste. In some embodiments, the asphalt shingle waste comprises 75% to 95% by weight of at least one of the limestone, granules, impurities, or any combination thereof, based on the total weight of the asphalt shingle waste. In some embodiments, the asphalt shingle waste comprises 80% to 95% by weight of at least one of the limestone, granules, impurities, or any combination thereof, based on the total weight of the asphalt shingle waste. In some embodiments, the asphalt shingle waste comprises 85% to 95% by weight of at least one of the limestone, granules, impurities, or any combination thereof, based on the total weight of the asphalt shingle waste. In some embodiments, the asphalt shingle waste comprises 90% to 95% by weight of at least one of the limestone, granules, impurities, or any combination thereof, based on the total weight of the asphalt shingle waste.

In some embodiments, the asphalt shingle waste comprises 50% to 85% by weight of at least one of the limestone, granules, impurities, or any combination thereof, based on the total weight of the asphalt shingle waste. In some embodiments, the asphalt shingle waste comprises 50% to 80% by weight of at least one of the limestone, granules, impurities, or any combination thereof, based on the total weight of the asphalt shingle waste. In some embodiments, the asphalt shingle waste comprises 50% to 75% by weight of at least one of the limestone, granules, impurities, or any combination thereof, based on the total weight of the asphalt shingle waste. In some embodiments, the asphalt shingle waste comprises 50% to 70% by weight of at least one of the limestone, granules, impurities, or any combination thereof, based on the total weight of the asphalt shingle waste. In some embodiments, the asphalt shingle waste comprises 50% to 65% by weight of at least one of the limestone, granules, impurities, or any combination thereof, based on the total weight of the asphalt shingle waste. In some embodiments, the asphalt shingle waste comprises 50% to 60% by weight of at least one of the limestone, granules, impurities, or any combination thereof, based on the total weight of the asphalt shingle waste. In some embodiments, the asphalt shingle waste comprises 50% to 55% by weight of at least one of the limestone, granules, impurities, or any combination thereof, based on the total weight of the asphalt shingle waste.

In some embodiments, the asphalt shingle waste comprises 1% to 99% by weight of the waste asphalt based on the total weight of the asphalt shingle waste. In some embodiments, the asphalt shingle waste comprises 1% to 90% by weight of the waste asphalt based on the total weight of the asphalt shingle waste. In some embodiments, the asphalt shingle waste comprises 1% to 80% by weight of the waste asphalt based on the total weight of the asphalt shingle waste. In some embodiments, the asphalt shingle waste comprises 1% to 70% by weight of the waste asphalt based on the total weight of the asphalt shingle waste. In some embodiments, the asphalt shingle waste comprises 1% to 60% by weight of the waste asphalt based on the total weight of the asphalt shingle waste. In some embodiments, the asphalt shingle waste comprises 1% to 50% by weight of the waste asphalt based on the total weight of the asphalt shingle waste. In some embodiments, the asphalt shingle waste comprises 1% to 40% by weight of the waste asphalt based on the total weight of the asphalt shingle waste. In some embodiments, the asphalt shingle waste comprises 1% to 30% by weight of the waste asphalt based on the total weight of the asphalt shingle waste. In some embodiments, the asphalt shingle waste comprises 1% to 20% by weight of the waste asphalt based on the total weight of the asphalt shingle waste. In some embodiments, the asphalt shingle waste comprises 1% to 10% by weight of the waste asphalt based on the total weight of the asphalt shingle waste.

In some embodiments, the asphalt shingle waste comprises 10% to 99% by weight of the waste asphalt based on the total weight of the asphalt shingle waste. In some embodiments, the asphalt shingle waste comprises 20% to 99% by weight of the waste asphalt based on the total weight of the asphalt shingle waste. In some embodiments, the asphalt shingle waste comprises 30% to 99% by weight of the waste asphalt based on the total weight of the asphalt shingle waste. In some embodiments, the asphalt shingle waste comprises 40% to 99% by weight of the waste asphalt based on the total weight of the asphalt shingle waste. In some embodiments, the asphalt shingle waste comprises 50% to 99% by weight of the waste asphalt based on the total weight of the asphalt shingle waste. In some embodiments, the asphalt shingle waste comprises 60% to 99% by weight of the waste asphalt based on the total weight of the asphalt shingle waste. In some embodiments, the asphalt shingle waste comprises 70% to 99% by weight of the waste asphalt based on the total weight of the asphalt shingle waste. In some embodiments, the asphalt shingle waste comprises 80% to 99% by weight of the waste asphalt based on the total weight of the asphalt shingle waste. In some embodiments, the asphalt shingle waste comprises 90% to 99% by weight of the waste asphalt based on the total weight of the asphalt shingle waste.

In some embodiments, the asphalt shingle waste comprises 1% to 99% by weight of at least one of the limestone, granules, impurities, or any combination thereof, based on the total weight of the asphalt shingle waste. In some embodiments, the asphalt shingle waste comprises 1% to 90% by weight of at least one of the limestone, granules, impurities, or any combination thereof, based on the total weight of the asphalt shingle waste. In some embodiments, the asphalt shingle waste comprises 1% to 80% by weight of at least one of the limestone, granules, impurities, or any combination thereof, based on the total weight of the asphalt shingle waste. In some embodiments, the asphalt shingle waste comprises 1% to 70% by weight of at least one of the limestone, granules, impurities, or any combination thereof, based on the total weight of the asphalt shingle waste. In some embodiments, the asphalt shingle waste comprises 1% to 60% by weight of at least one of the limestone, granules, impurities, or any combination thereof, based on the total weight of the asphalt shingle waste. In some embodiments, the asphalt shingle waste comprises 1% to 50% by weight of at least one of the limestone, granules, impurities, or any combination thereof, based on the total weight of the asphalt shingle waste. In some embodiments, the asphalt shingle waste comprises 1% to 40% by weight of at least one of the limestone, granules, impurities, or any combination thereof, based on the total weight of the asphalt shingle waste. In some embodiments, the asphalt shingle waste comprises 1% to 30% by weight of at least one of the limestone, granules, impurities, or any combination thereof, based on the total weight of the asphalt shingle waste. In some embodiments, the asphalt shingle waste comprises 1% to 20% by weight of at least one of the limestone, granules, impurities, or any combination thereof, based on the total weight of the asphalt shingle waste. In some embodiments, the asphalt shingle waste comprises 1% to 10% by weight of at least one of the limestone, granules, impurities, or any combination thereof, based on the total weight of the asphalt shingle waste.

In some embodiments, the asphalt shingle waste comprises 10% to 99% by weight of at least one of the limestone, granules, impurities, or any combination thereof, based on the total weight of the asphalt shingle waste. In some embodiments, the asphalt shingle waste comprises 20% to 99% by weight of at least one of the limestone, granules, impurities, or any combination thereof, based on the total weight of the asphalt shingle waste. In some embodiments, the asphalt shingle waste comprises 30% to 99% by weight of at least one of the limestone, granules, impurities, or any combination thereof, based on the total weight of the asphalt shingle waste. In some embodiments, the asphalt shingle waste comprises 40% to 99% by weight of at least one of the limestone, granules, impurities, or any combination thereof, based on the total weight of the asphalt shingle waste. In some embodiments, the asphalt shingle waste comprises 50% to 99% by weight of at least one of the limestone, granules, impurities, or any combination thereof, based on the total weight of the asphalt shingle waste. In some embodiments, the asphalt shingle waste comprises 60% to 99% by weight of at least one of the limestone, granules, impurities, or any combination thereof, based on the total weight of the asphalt shingle waste. In some embodiments, the asphalt shingle waste comprises 70% to 99% by weight of at least one of the limestone, granules, impurities, or any combination thereof, based on the total weight of the asphalt shingle waste. In some embodiments, the asphalt shingle waste comprises 80% to 99% by weight of at least one of the limestone, granules, impurities, or any combination thereof, based on the total weight of the asphalt shingle waste. In some embodiments, the asphalt shingle waste comprises 90% to 99% by weight of at least one of the limestone, granules, impurities, or any combination thereof, based on the total weight of the asphalt shingle waste.

In some embodiments, the asphalt filled coating comprises at least one additive. In some embodiments, the at least one additive comprises at least one of a dye, a pigment, a fire retardant, a stabilizer, such as, e.g., a UV stabilizer, or any combination thereof. Non-limiting examples of pigments and/or dyes include at least one of colorants, IR reflective pigments, dyes, phosphorescence pigments, phosphorescence dyes, fluorescence pigments, fluorescence dyes, or any combination thereof. Non-limiting examples of pigments include color pigments and/or reflective pigments, such as Colonial Red, which is a reflective pigment that is available from Americhem Inc., Cuyahoga Falls, Ohio. Non-limiting examples of UV stabilizers include at least one of UV absorbers, hinder amine light stabilizers, anti-oxidant pigments, carriers (e.g., such as PP, PE, or IPP), or any combination thereof. In an embodiment, the coating further includes a tackifier. In some embodiments, the asphalt filled coating comprises titanium dioxide, such as Ti Pure™ Titanium Dioxide from Chemours, Wilmington, Del. Adding titanium dioxide to the coating can, for example, improve and/or increase the reflectivity of a roofing material prepared using the coating.

In some embodiments, the asphalt filled coating comprises 1% to 50% by weight of the asphalt based on a total weight of the asphalt filled coating. In some embodiments, the asphalt filled coating comprises 5% to 50% by weight of the asphalt based on the total weight of the asphalt filled coating. In some embodiments, the asphalt filled coating comprises 10% to 50% by weight of the asphalt based on the total weight of the asphalt filled coating. In some embodiments, the asphalt filled coating comprises 15% to 50% by weight of the asphalt based on the total weight of the asphalt filled coating. In some embodiments, the asphalt filled coating comprises 20% to 50% by weight of the asphalt based on the total weight of the asphalt filled coating. In some embodiments, the asphalt filled coating comprises 25% to 50% by weight of the asphalt based on the total weight of the asphalt filled coating. In some embodiments, the asphalt filled coating comprises 30% to 50% by weight of the asphalt based on the total weight of the asphalt filled coating. In some embodiments, the asphalt filled coating comprises 35% to 50% by weight of the asphalt based on the total weight of the asphalt filled coating. In some embodiments, the asphalt filled coating comprises 40% to 50% by weight of the asphalt based on the total weight of the asphalt filled coating. In some embodiments, the asphalt filled coating comprises 45% to 50% by weight of the asphalt based on the total weight of the asphalt filled coating.

In some embodiments, the asphalt filled coating comprises 1% to 45% by weight of the asphalt based on the total weight of the asphalt filled coating. In some embodiments, the asphalt filled coating comprises 1% to 40% by weight of the asphalt based on the total weight of the asphalt filled coating. In some embodiments, the asphalt filled coating comprises 1% to 35% by weight of the asphalt based on the total weight of the asphalt filled coating. In some embodiments, the asphalt filled coating comprises 1% to 30% by weight of the asphalt based on the total weight of the asphalt filled coating. In some embodiments, the asphalt filled coating comprises 1% to 25% by weight of the asphalt based on the total weight of the asphalt filled coating. In some embodiments, the asphalt filled coating comprises 1% to 20% by weight of the asphalt based on the total weight of the asphalt filled coating. In some embodiments, the asphalt filled coating comprises 1% to 15% by weight of the asphalt based on the total weight of the asphalt filled coating. In some embodiments, the asphalt filled coating comprises 1% to 10% by weight of the asphalt based on the total weight of the asphalt filled coating. In some embodiments, the asphalt filled coating comprises 1% to 5% by weight of the asphalt based on the total weight of the asphalt filled coating.

In some embodiments, the asphalt filled coating comprises 1% to 20% by weight of the polymer modifier based on the total weight of the asphalt filled coating. In some embodiments, the asphalt filled coating comprises 2% to 20% by weight of the polymer modifier based on the total weight of the asphalt filled coating. In some embodiments, the asphalt filled coating comprises 4% to 20% by weight of the polymer modifier based on the total weight of the asphalt filled coating. In some embodiments, the asphalt filled coating comprises 6% to 20% by weight of the polymer modifier based on the total weight of the asphalt filled coating. In some embodiments, the asphalt filled coating comprises 8% to 20% by weight of the polymer modifier based on the total weight of the asphalt filled coating. In some embodiments, the asphalt filled coating comprises 10% to 20% by weight of the polymer modifier based on the total weight of the asphalt filled coating. In some embodiments, the asphalt filled coating comprises 12% to 20% by weight of the polymer modifier based on the total weight of the asphalt filled coating. In some embodiments, the asphalt filled coating comprises 14% to 20% by weight of the polymer modifier based on the total weight of the asphalt filled coating. In some embodiments, the asphalt filled coating comprises 16% to 20% by weight of the polymer modifier based on the total weight of the asphalt filled coating. In some embodiments, the asphalt filled coating comprises 18% to 20% by weight of the polymer modifier based on the total weight of the asphalt filled coating.

In some embodiments, the asphalt filled coating comprises 1% to 18% by weight of the polymer modifier based on the total weight of the asphalt filled coating. In some embodiments, the asphalt filled coating comprises 1% to 16% by weight of the polymer modifier based on the total weight of the asphalt filled coating. In some embodiments, the asphalt filled coating comprises 1% to 15% by weight of the polymer modifier based on the total weight of the asphalt filled coating. In some embodiments, the asphalt filled coating comprises 1% to 14% by weight of the polymer modifier based on the total weight of the asphalt filled coating. In some embodiments, the asphalt filled coating comprises 1% to 12% by weight of the polymer modifier based on the total weight of the asphalt filled coating. In some embodiments, the asphalt filled coating comprises 1% to 10% by weight of the polymer modifier based on the total weight of the asphalt filled coating. In some embodiments, the asphalt filled coating comprises 1% to 8% by weight of the polymer modifier based on the total weight of the asphalt filled coating. In some embodiments, the asphalt filled coating comprises 1% to 6% by weight of the polymer modifier based on the total weight of the asphalt filled coating. In some embodiments, the asphalt filled coating comprises 1% to 5% by weight of the polymer modifier based on the total weight of the asphalt filled coating. In some embodiments, the asphalt filled coating comprises 1% to 4% by weight of the polymer modifier based on the total weight of the asphalt filled coating. In some embodiments, the asphalt filled coating comprises 1% to 2% by weight of the polymer modifier based on the total weight of the asphalt filled coating.

In some embodiments, the asphalt filled coating comprises at least 50% by weight of the asphalt shingle waste based on the total weight of the asphalt filled coating. In some embodiments, the asphalt filled coating comprises at least 60% by weight of the asphalt shingle waste based on the total weight of the asphalt filled coating. In some embodiments, the asphalt filled coating comprises at least 70% by weight of the asphalt shingle waste based on the total weight of the asphalt filled coating. In some embodiments, the asphalt filled coating comprises at least 80% by weight of the asphalt shingle waste based on the total weight of the asphalt filled coating. In some embodiments, the asphalt filled coating comprises at least 90% by weight of the asphalt shingle waste based on the total weight of the asphalt filled coating.

In some embodiments, the asphalt filled coating comprises 50% to 95% by weight of the asphalt shingle waste based on the total weight of the asphalt filled coating. In some embodiments, the asphalt filled coating comprises 55% to 95% by weight of the asphalt shingle waste based on the total weight of the asphalt filled coating. In some embodiments, the asphalt filled coating comprises 60% to 95% by weight of the asphalt shingle waste based on the total weight of the asphalt filled coating. In some embodiments, the asphalt filled coating comprises 65% to 95% by weight of the asphalt shingle waste based on the total weight of the asphalt filled coating. In some embodiments, the asphalt filled coating comprises 70% to 95% by weight of the asphalt shingle waste based on the total weight of the asphalt filled coating. In some embodiments, the asphalt filled coating comprises 75% to 95% by weight of the asphalt shingle waste based on the total weight of the asphalt filled coating. In some embodiments, the asphalt filled coating comprises 80% to 95% by weight of the asphalt shingle waste based on the total weight of the asphalt filled coating. In some embodiments, the asphalt filled coating comprises 85% to 95% by weight of the asphalt shingle waste based on the total weight of the asphalt filled coating. In some embodiments, the asphalt filled coating comprises 90% to 95% by weight of the asphalt shingle waste based on the total weight of the asphalt filled coating.

In some embodiments, the asphalt filled coating comprises 50% to 90% by weight of the asphalt shingle waste based on the total weight of the asphalt filled coating. In some embodiments, the asphalt filled coating comprises 50% to 85% by weight of the asphalt shingle waste based on the total weight of the asphalt filled coating. In some embodiments, the asphalt filled coating comprises 50% to 80% by weight of the asphalt shingle waste based on the total weight of the asphalt filled coating. In some embodiments, the asphalt filled coating comprises 50% to 75% by weight of the asphalt shingle waste based on the total weight of the asphalt filled coating. In some embodiments, the asphalt filled coating comprises 50% to 70% by weight of the asphalt shingle waste based on the total weight of the asphalt filled coating. In some embodiments, the asphalt filled coating comprises 50% to 65% by weight of the asphalt shingle waste based on the total weight of the asphalt filled coating. In some embodiments, the asphalt filled coating comprises 50% to 60% by weight of the asphalt shingle waste based on the total weight of the asphalt filled coating. In some embodiments, the asphalt filled coating comprises 50% to 55% by weight of the asphalt shingle waste based on the total weight of the asphalt filled coating.

In some embodiments, the asphalt filled coating comprises 55% to 85% by weight of the asphalt shingle waste based on the total weight of the asphalt filled coating. In some embodiments, the asphalt filled coating comprises 55% to 80% by weight of the asphalt shingle waste based on the total weight of the asphalt filled coating. In some embodiments, the asphalt filled coating comprises 60% to 80% by weight of the asphalt shingle waste based on the total weight of the asphalt filled coating. In some embodiments, the asphalt filled coating comprises 60% to 85% by weight of the asphalt shingle waste based on the total weight of the asphalt filled coating. In some embodiments, the asphalt filled coating comprises 65% to 85% by weight of the asphalt shingle waste based on the total weight of the asphalt filled coating.

In some embodiments, the asphalt filled coating comprises 5% to 50% by weight of the asphalt and the polymer modifier based on the total weight of the asphalt filled coating. In some embodiments, the asphalt filled coating comprises 10% to 50% by weight of the asphalt and the polymer modifier based on the total weight of the asphalt filled coating. In some embodiments, the asphalt filled coating comprises 15% to 50% by weight of the asphalt and the polymer modifier based on the total weight of the asphalt filled coating. In some embodiments, the asphalt filled coating comprises 20% to 50% by weight of the asphalt and the polymer modifier based on the total weight of the asphalt filled coating. In some embodiments, the asphalt filled coating comprises 25% to 50% by weight of the asphalt and the polymer modifier based on the total weight of the asphalt filled coating. In some embodiments, the asphalt filled coating comprises 30% to 50% by weight of the asphalt and the polymer modifier based on the total weight of the asphalt filled coating. In some embodiments, the asphalt filled coating comprises 35% to 50% by weight of the asphalt and the polymer modifier based on the total weight of the asphalt filled coating. In some embodiments, the asphalt filled coating comprises 40% to 50% by weight of the asphalt and the polymer modifier based on the total weight of the asphalt filled coating. In some embodiments, the asphalt filled coating comprises 45% to 50% by weight of the asphalt and the polymer modifier based on the total weight of the asphalt filled coating.

In some embodiments, the asphalt filled coating comprises 5% to 45% by weight of the asphalt and the polymer modifier based on the total weight of the asphalt filled coating. In some embodiments, the asphalt filled coating comprises 5% to 40% by weight of the asphalt and the polymer modifier based on the total weight of the asphalt filled coating. In some embodiments, the asphalt filled coating comprises 5% to 35% by weight of the asphalt and the polymer modifier based on the total weight of the asphalt filled coating. In some embodiments, the asphalt filled coating comprises 5% to 30% by weight of the asphalt and the polymer modifier based on the total weight of the asphalt filled coating. In some embodiments, the asphalt filled coating comprises 5% to 25% by weight of the asphalt and the polymer modifier based on the total weight of the asphalt filled coating. In some embodiments, the asphalt filled coating comprises 5% to 20% by weight of the asphalt and the polymer modifier based on the total weight of the asphalt filled coating. In some embodiments, the asphalt filled coating comprises 5% to 15% by weight of the asphalt and the polymer modifier based on the total weight of the asphalt filled coating. In some embodiments, the asphalt filled coating comprises 5% to 10% by weight of the asphalt and the polymer modifier based on the total weight of the asphalt filled coating.

In some embodiments, the asphalt filled coating comprises 15% to 45% by weight of the asphalt and the polymer modifier based on the total weight of the asphalt filled coating. In some embodiments, the asphalt filled coating comprises 15% to 40% by weight of the asphalt and the polymer modifier based on the total weight of the asphalt filled coating. In some embodiments, the asphalt filled coating comprises 20% to 40% by weight of the asphalt and the polymer modifier based on the total weight of the asphalt filled coating. In some embodiments, the asphalt filled coating comprises 20% to 45% by weight of the asphalt and the polymer modifier based on the total weight of the asphalt filled coating. In some embodiments, the asphalt filled coating comprises 25% to 45% by weight of the asphalt and the polymer modifier based on the total weight of the asphalt filled coating.

In some embodiments, the asphalt filled coating is substantially free of a virgin filler. In some embodiments, for example, the asphalt filled coating comprises 5% by weight or less of the virgin filler based on the total weight of the asphalt filled coating. In some embodiments, for example, the asphalt filled coating comprises 4% by weight or less of the virgin filler based on the total weight of the asphalt filled coating. In some embodiments, for example, the asphalt filled coating comprises 3% by weight or less of the virgin filler based on the total weight of the asphalt filled coating. In some embodiments, for example, the asphalt filled coating comprises 2% by weight or less of the virgin filler based on the total weight of the asphalt filled coating In some embodiments, for example, the asphalt filled coating comprises 1% by weight or less of the virgin filler based on the total weight of the asphalt filled coating. In some embodiments, for example, the asphalt filled coating comprises 1% to 5% by weight or less of the virgin filler based on the total weight of the asphalt filled coating. In some embodiments, for example, the asphalt filled coating comprises 1% to 4% by weight or less of the virgin filler based on the total weight of the asphalt filled coating. In some embodiments, for example, the asphalt filled coating comprises 1% to 3% by weight or less of the virgin filler based on the total weight of the asphalt filled coating. In some embodiments, for example, the asphalt filled coating comprises 1% to 2% by weight or less of the virgin filler based on the total weight of the asphalt filled coating. In some embodiments, for example, the asphalt filled coating comprises 2% to 5% by weight or less of the virgin filler based on the total weight of the asphalt filled coating. In some embodiments, for example, the asphalt filled coating comprises 3% to 5% by weight or less of the virgin filler based on the total weight of the asphalt filled coating. In some embodiments, for example, the asphalt filled coating comprises 4% to 5% by weight or less of the virgin filler based on the total weight of the asphalt filled coating.

In some embodiments, the asphalt filled coating is free of the virgin filler. In some embodiments, for example, the asphalt filled coating comprises 1% by weight or less of the virgin filler based on the total weight of the asphalt filled coating. In some embodiments, the asphalt filled coating comprises 0.9% by weight or less of the virgin filler based on the total weight of the asphalt filled coating. In some embodiments, the asphalt filled coating comprises 0.8% by weight or less of the virgin filler based on the total weight of the asphalt filled coating. In some embodiments, the asphalt filled coating comprises 0.7% by weight or less of the virgin filler based on the total weight of the asphalt filled coating. In some embodiments, the asphalt filled coating comprises 0.6% by weight or less of the virgin filler based on the total weight of the asphalt filled coating. In some embodiments, the asphalt filled coating comprises 0.5% by weight or less of the virgin filler based on the total weight of the asphalt filled coating. In some embodiments, the asphalt filled coating comprises 0.4% by weight or less of the virgin filler based on the total weight of the asphalt filled coating. In some embodiments, the asphalt filled coating comprises 0.3% by weight or less of the virgin filler based on the total weight of the asphalt filled coating. In some embodiments, the asphalt filled coating comprises 0.2% by weight or less of the virgin filler based on the total weight of the asphalt filled coating. In some embodiments, the asphalt filled coating comprises 0.1% by weight or less of the virgin filler based on the total weight of the asphalt filled coating.

In some embodiments, the asphalt filled coating comprises 0.001% to 1% by weight or less of the virgin filler based on the total weight of the asphalt filled coating. In some embodiments, the asphalt filled coating comprises 0.01% to 1% by weight or less of the virgin filler based on the total weight of the asphalt filled coating. In some embodiments, the asphalt filled coating comprises 0.1% to 1% by weight or less of the virgin filler based on the total weight of the asphalt filled coating. In some embodiments, the asphalt filled coating comprises 0.2% to 1% by weight or less of the virgin filler based on the total weight of the asphalt filled coating. In some embodiments, the asphalt filled coating comprises 0.3% to 1% by weight or less of the virgin filler based on the total weight of the asphalt filled coating. In some embodiments, the asphalt filled coating comprises 0.4% to 1% by weight or less of the virgin filler based on the total weight of the asphalt filled coating. In some embodiments, the asphalt filled coating comprises 0.5% to 1% by weight or less of the virgin filler based on the total weight of the asphalt filled coating. In some embodiments, the asphalt filled coating comprises 0.6% to 1% by weight or less of the virgin filler based on the total weight of the asphalt filled coating. In some embodiments, the asphalt filled coating comprises 0.7% to 1% by weight or less of the virgin filler based on the total weight of the asphalt filled coating. In some embodiments, the asphalt filled coating comprises 0.8% to 1% by weight or less of the virgin filler based on the total weight of the asphalt filled coating. In some embodiments, the asphalt filled coating comprises 0.9% to 1% by weight or less of the virgin filler based on the total weight of the asphalt filled coating.

In some embodiments, the asphalt filled coating comprises 0.001% to 0.9% by weight or less of the virgin filler based on the total weight of the asphalt filled coating. In some embodiments, the asphalt filled coating comprises 0.001% to 0.8% by weight or less of the virgin filler based on the total weight of the asphalt filled coating. In some embodiments, the asphalt filled coating comprises 0.001% to 0.7% by weight or less of the virgin filler based on the total weight of the asphalt filled coating. In some embodiments, the asphalt filled coating comprises 0.001% to 0.6% by weight or less of the virgin filler based on the total weight of the asphalt filled coating. In some embodiments, the asphalt filled coating comprises 0.001% to 0.5% by weight or less of the virgin filler based on the total weight of the asphalt filled coating. In some embodiments, the asphalt filled coating comprises 0.001% to 0.4% by weight or less of the virgin filler based on the total weight of the asphalt filled coating. In some embodiments, the asphalt filled coating comprises 0.001% to 0.3% by weight or less of the virgin filler based on the total weight of the asphalt filled coating. In some embodiments, the asphalt filled coating comprises 0.001% to 0.2% by weight or less of the virgin filler based on the total weight of the asphalt filled coating.

In some embodiments, the asphalt filled coating comprises 0.001% to 0.1% by weight or less of the virgin filler based on the total weight of the asphalt filled coating. In some embodiments, the asphalt filled coating comprises 0.001% to 0.01% by weight or less of the virgin filler based on the total weight of the asphalt filled coating. In some embodiments, the asphalt filled coating does not comprise the virgin filler.

In some embodiments, the asphalt filled coating comprises less than 50% by weight of the virgin filler based on the total weight of the asphalt filled coating. In some embodiments, the asphalt filled coating comprises less than 40% by weight of the virgin filler based on the total weight of the asphalt filled coating. In some embodiments, the asphalt filled coating comprises less than 30% by weight of the virgin filler based on the total weight of the asphalt filled coating. In some embodiments, the asphalt filled coating comprises less than 20% by weight of the virgin filler based on the total weight of the asphalt filled coating. In some embodiments, the asphalt filled coating comprises less than 10% by weight of the virgin filler based on the total weight of the asphalt filled coating. In some embodiments, the asphalt filled coating comprises less than 5% by weight of the virgin filler based on the total weight of the asphalt filled coating. In some embodiments, the asphalt filled coating comprises less than 1% by weight of the virgin filler based on the total weight of the asphalt filled coating.

In some embodiments, the asphalt filled coating comprises 1% to 40% by weight of a virgin filler based on the total weight of the asphalt filled coating. In some embodiments, the asphalt filled coating comprises 1% to 35% by weight of a virgin filler based on the total weight of the asphalt filled coating. In some embodiments, the asphalt filled coating comprises 1% to 30% by weight of a virgin filler based on the total weight of the asphalt filled coating. In some embodiments, the asphalt filled coating comprises 1% to 25% by weight of a virgin filler based on the total weight of the asphalt filled coating. In some embodiments, the asphalt filled coating comprises 1% to 20% by weight of a virgin filler based on the total weight of the asphalt filled coating. In some embodiments, the asphalt filled coating comprises 1% to 15% by weight of a virgin filler based on the total weight of the asphalt filled coating. In some embodiments, the asphalt filled coating comprises 1% to 10% by weight of a virgin filler based on the total weight of the asphalt filled coating. In some embodiments, the asphalt filled coating comprises 1% to 5% by weight of a virgin filler based on the total weight of the asphalt filled coating.

In some embodiments, the asphalt filled coating comprises 5% to 40% by weight of a virgin filler based on the total weight of the asphalt filled coating. In some embodiments, the asphalt filled coating comprises 10% to 40% by weight of a virgin filler based on the total weight of the asphalt filled coating. In some embodiments, the asphalt filled coating comprises 15% to 40% by weight of a virgin filler based on the total weight of the asphalt filled coating. In some embodiments, the asphalt filled coating comprises 20% to 40% by weight of a virgin filler based on the total weight of the asphalt filled coating. In some embodiments, the asphalt filled coating comprises 25% to 40% by weight of a virgin filler based on the total weight of the asphalt filled coating. In some embodiments, the asphalt filled coating comprises 30% to 40% by weight of a virgin filler based on the total weight of the asphalt filled coating. In some embodiments, the asphalt filled coating comprises 35% to 40% by weight of a virgin filler based on the total weight of the asphalt filled coating.

In some embodiments, the asphalt filled coating comprises 1% to 50% by weight of at least one additive based on the total weight of the asphalt filled coating. In some embodiments, the asphalt filled coating comprises 1% to 45% by weight of at least one additive based on the total weight of the asphalt filled coating. In some embodiments, the asphalt filled coating comprises 1% to 40% by weight of at least one additive based on the total weight of the asphalt filled coating. In some embodiments, the asphalt filled coating comprises 1% to 35% by weight of at least one additive based on the total weight of the asphalt filled coating. In some embodiments, the asphalt filled coating comprises 1% to 30% by weight of at least one additive based on the total weight of the asphalt filled coating. In some embodiments, the asphalt filled coating comprises 1% to 25% by weight of at least one additive based on the total weight of the asphalt filled coating. In some embodiments, the asphalt filled coating comprises 1% to 20% by weight of at least one additive based on the total weight of the asphalt filled coating. In some embodiments, the asphalt filled coating comprises 1% to 15% by weight of at least one additive based on the total weight of the asphalt filled coating. In some embodiments, the asphalt filled coating comprises 1% to 10% by weight of at least one additive based on the total weight of the asphalt filled coating. In some embodiments, the asphalt filled coating comprises 1% to 5% by weight of at least one additive based on the total weight of the asphalt filled coating.

In some embodiments, the asphalt filled coating comprises 5% to 50% by weight of at least one additive based on the total weight of the asphalt filled coating. In some embodiments, the asphalt filled coating comprises 10% to 50% by weight of at least one additive based on the total weight of the asphalt filled coating. In some embodiments, the asphalt filled coating comprises 15% to 50% by weight of at least one additive based on the total weight of the asphalt filled coating. In some embodiments, the asphalt filled coating comprises 20% to 50% by weight of at least one additive based on the total weight of the asphalt filled coating. In some embodiments, the asphalt filled coating comprises 25% to 50% by weight of at least one additive based on the total weight of the asphalt filled coating. In some embodiments, the asphalt filled coating comprises 30% to 50% by weight of at least one additive based on the total weight of the asphalt filled coating. In some embodiments, the asphalt filled coating comprises 35% to 50% by weight of at least one additive based on the total weight of the asphalt filled coating. In some embodiments, the asphalt filled coating comprises 40% to 50% by weight of at least one additive based on the total weight of the asphalt filled coating. In some embodiments, the asphalt filled coating comprises 45% to 50% by weight of at least one additive based on the total weight of the asphalt filled coating.

In some embodiments, the asphalt filled coating comprises 50% to 99% by weight of the asphalt based on a total weight of the asphalt and the polymer modifier. In some embodiments, the asphalt filled coating comprises 55% to 99% by weight of the asphalt based on a total weight of the asphalt and the polymer modifier. In some embodiments, the asphalt filled coating comprises 60% to 99% by weight of the asphalt based on a total weight of the asphalt and the polymer modifier. In some embodiments, the asphalt filled coating comprises 65% to 99% by weight of the asphalt based on a total weight of the asphalt and the polymer modifier. In some embodiments, the asphalt filled coating comprises 70% to 99% by weight of the asphalt based on a total weight of the asphalt and the polymer modifier. In some embodiments, the asphalt filled coating comprises 75% to 99% by weight of the asphalt based on a total weight of the asphalt and the polymer modifier. In some embodiments, the asphalt filled coating comprises 80% to 99% by weight of the asphalt based on a total weight of the asphalt and the polymer modifier. In some embodiments, the asphalt filled coating comprises 85% to 99% by weight of the asphalt based on a total weight of the asphalt and the polymer modifier. In some embodiments, the asphalt filled coating comprises 90% to 99% by weight of the asphalt based on a total weight of the asphalt and the polymer modifier. In some embodiments, the asphalt filled coating comprises 95% to 99% by weight of the asphalt based on a total weight of the asphalt and the polymer modifier.

In some embodiments, the asphalt filled coating comprises 50% to 95% by weight of the asphalt based on a total weight of the asphalt and the polymer modifier. In some embodiments, the asphalt filled coating comprises 50% to 90% by weight of the asphalt based on a total weight of the asphalt and the polymer modifier. In some embodiments, the asphalt filled coating comprises 50% to 85% by weight of the asphalt based on a total weight of the asphalt and the polymer modifier. In some embodiments, the asphalt filled coating comprises 50% to 80% by weight of the asphalt based on a total weight of the asphalt and the polymer modifier. In some embodiments, the asphalt filled coating comprises 50% to 75% by weight of the asphalt based on a total weight of the asphalt and the polymer modifier. In some embodiments, the asphalt filled coating comprises 50% to 70% by weight of the asphalt based on a total weight of the asphalt and the polymer modifier. In some embodiments, the asphalt filled coating comprises 50% to 65% by weight of the asphalt based on a total weight of the asphalt and the polymer modifier. In some embodiments, the asphalt filled coating comprises 50% to 60% by weight of the asphalt based on a total weight of the asphalt and the polymer modifier. In some embodiments, the asphalt filled coating comprises 50% to 55% by weight of the asphalt based on a total weight of the asphalt and the polymer modifier.

In some embodiments, the asphalt filled coating comprises 1% to 50% by weight of the polymer modifier based on the total weight of the asphalt and the polymer modifier. In some embodiments, the asphalt filled coating comprises 5% to 50% by weight of the polymer modifier based on the total weight of the asphalt and the polymer modifier. In some embodiments, the asphalt filled coating comprises 10% to 50% by weight of the polymer modifier based on the total weight of the asphalt and the polymer modifier. In some embodiments, the asphalt filled coating comprises 15% to 50% by weight of the polymer modifier based on the total weight of the asphalt and the polymer modifier. In some embodiments, the asphalt filled coating comprises 20% to 50% by weight of the polymer modifier based on the total weight of the asphalt and the polymer modifier. In some embodiments, the asphalt filled coating comprises 25% to 50% by weight of the polymer modifier based on the total weight of the asphalt and the polymer modifier. In some embodiments, the asphalt filled coating comprises 30% to 50% by weight of the polymer modifier based on the total weight of the asphalt and the polymer modifier. In some embodiments, the asphalt filled coating comprises 35% to 50% by weight of the polymer modifier based on the total weight of the asphalt and the polymer modifier. In some embodiments, the asphalt filled coating comprises 40% to 50% by weight of the polymer modifier based on the total weight of the asphalt and the polymer modifier. In some embodiments, the asphalt filled coating comprises 45% to 50% by weight of the polymer modifier based on the total weight of the asphalt and the polymer modifier.

In some embodiments, the asphalt filled coating comprises 1% to 45% by weight of the polymer modifier based on the total weight of the asphalt and the polymer modifier. In some embodiments, the asphalt filled coating comprises 1% to 40% by weight of the polymer modifier based on the total weight of the asphalt and the polymer modifier. In some embodiments, the asphalt filled coating comprises 1% to 35% by weight of the polymer modifier based on the total weight of the asphalt and the polymer modifier. In some embodiments, the asphalt filled coating comprises 1% to 30% by weight of the polymer modifier based on the total weight of the asphalt and the polymer modifier. In some embodiments, the asphalt filled coating comprises 1% to 25% by weight of the polymer modifier based on the total weight of the asphalt and the polymer modifier. In some embodiments, the asphalt filled coating comprises 1% to 20% by weight of the polymer modifier based on the total weight of the asphalt and the polymer modifier. In some embodiments, the asphalt filled coating comprises 1% to 15% by weight of the polymer modifier based on the total weight of the asphalt and the polymer modifier. In some embodiments, the asphalt filled coating comprises 1% to 10% by weight of the polymer modifier based on the total weight of the asphalt and the polymer modifier. In some embodiments, the asphalt filled coating comprises 1% to 5% by weight of the polymer modifier based on the total weight of the asphalt and the polymer modifier.

In some embodiments, the roofing material exhibits, when tested according to a three-point bending test at a constant rate of 100 microns per second and a temperature of 20° C., an axial force of 25 N or less at a displacement of 0.1 mm to 10 mm. In some embodiments, the roofing material exhibits an axial force of 20 N or less at a displacement of 0.1 mm to 10 mm. In some embodiments, the roofing material exhibits an axial force of 15 N or less at a displacement of 0.1 mm to 10 mm. In some embodiments, the roofing material exhibits an axial force of 10 N or less at a displacement of 0.1 mm to 10 mm. In some embodiments, the roofing material exhibits an axial force of 5 N or less at a displacement of 0.1 mm to 10 mm.

In some embodiments, the roofing material exhibits, when tested according to a three-point bending test at a constant rate of 100 microns per second and a temperature of 20° C., an axial force of 2 N to 25 N at a displacement of 0.1 mm to 10 mm. In some embodiments, the roofing material exhibits an axial force of 2 N to 20 N at a displacement of 0.1 mm to 10 mm. In some embodiments, the roofing material exhibits an axial force of 2 N to 15 N at a displacement of 0.1 mm to 10 mm. In some embodiments, the roofing material exhibits an axial force of 2 N to 10 N at a displacement of 0.1 mm to 10 mm. In some embodiments, the roofing material exhibits an axial force of 2 N to 5 N at a displacement of 0.1 mm to 10 mm. In some embodiments, the roofing material exhibits an axial force of 5 N to 25 N at a displacement of 0.1 mm to 10 mm. In some embodiments, the roofing material exhibits an axial force of 10 N to 25 N at a displacement of 0.1 mm to 10 mm. In some embodiments, the roofing material exhibits an axial force of 15 N to 25 N at a displacement of 0.1 mm to 10 mm. In some embodiments, the roofing material exhibits an axial force of 20 N to 25 N at a displacement of 0.1 mm to 10 mm.

In some embodiments, a thickness of the asphalt filled coating is 1 mil to 200 mils. In some embodiments, a thickness of the asphalt filled coating is 10 mils to 200 mils. In some embodiments, a thickness of the asphalt filled coating is 20 mils to 200 mils. In some embodiments, a thickness of the asphalt filled coating is 30 mils to 200 mils. In some embodiments, a thickness of the asphalt filled coating is 40 mils to 200 mils. In some embodiments, a thickness of the asphalt filled coating is 50 mils to 200 mils. In some embodiments, a thickness of the asphalt filled coating is 60 mils to 200 mils. In some embodiments, a thickness of the asphalt filled coating is 70 mils to 200 mils. In some embodiments, a thickness of the asphalt filled coating is 80 mils to 200 mils. In some embodiments, a thickness of the asphalt filled coating is 90 mils to 200 mils. In some embodiments, a thickness of the asphalt filled coating is 100 mils to 200 mils. In some embodiments, a thickness of the asphalt filled coating is 110 mils to 200 mils. In some embodiments, a thickness of the asphalt filled coating is 120 mils to 200 mils. In some embodiments, a thickness of the asphalt filled coating is 130 mils to 200 mils. In some embodiments, a thickness of the asphalt filled coating is 140 mils to 200 mils. In some embodiments, a thickness of the asphalt filled coating is 150 mils to 200 mils. In some embodiments, a thickness of the asphalt filled coating is 160 mils to 200 mils. In some embodiments, a thickness of the asphalt filled coating is 170 mils to 200 mils. In some embodiments, a thickness of the asphalt filled coating is 180 mils to 200 mils. In some embodiments, a thickness of the asphalt filled coating is 190 mils to 200 mils.

In some embodiments, a thickness of the asphalt filled coating is 1 mil to 190 mils. In some embodiments, a thickness of the asphalt filled coating is 1 mil to 180 mils. In some embodiments, a thickness of the asphalt filled coating is 1 mil to 170 mils. In some embodiments, a thickness of the asphalt filled coating is 1 mil to 160 mils. In some embodiments, a thickness of the asphalt filled coating is 1 mil to 150 mils. In some embodiments, a thickness of the asphalt filled coating is 1 mil to 140 mils. In some embodiments, a thickness of the asphalt filled coating is 1 mil to 130 mils. In some embodiments, a thickness of the asphalt filled coating is 1 mil to 120 mils. In some embodiments, a thickness of the asphalt filled coating is 1 mil to 110 mils. In some embodiments, a thickness of the asphalt filled coating is 1 mil to 100 mils. In some embodiments, a thickness of the asphalt filled coating is 1 mil to 90 mils. In some embodiments, a thickness of the asphalt filled coating is 1 mil to 80 mils. In some embodiments, a thickness of the asphalt filled coating is 1 mil to 70 mils. In some embodiments, a thickness of the asphalt filled coating is 1 mil to 60 mils. In some embodiments, a thickness of the asphalt filled coating is 1 mil to 50 mils. In some embodiments, a thickness of the asphalt filled coating is 1 mil to 40 mils. In some embodiments, a thickness of the asphalt filled coating is 1 mil to 30 mils. In some embodiments, a thickness of the asphalt filled coating is 1 mil to 20 mils. In some embodiments, a thickness of the asphalt filled coating is 1 mil to 10 mils.

In some embodiments, the asphalt filled coating has a penetration point of 15 dmm to 45 dmm as measured according to ASTM D-5. In some embodiments, the asphalt filled coating has a penetration point of 16 dmm to 45 dmm as measured according to ASTM D-5. In some embodiments, the asphalt filled coating has a penetration point of 18 dmm to 45 dmm as measured according to ASTM D-5. In some embodiments, the asphalt filled coating has a penetration point of 20 dmm to 45 dmm as measured according to ASTM D-5. In some embodiments, the asphalt filled coating has a penetration point of 22 dmm to 45 dmm as measured according to ASTM D-5. In some embodiments, the asphalt filled coating has a penetration point of 24 dmm to 45 dmm as measured according to ASTM D-5. In some embodiments, the asphalt filled coating has a penetration point of 26 dmm to 45 dmm as measured according to ASTM D-5. In some embodiments, the asphalt filled coating has a penetration point of 28 dmm to 45 dmm as measured according to ASTM D-5. In some embodiments, the asphalt filled coating has a penetration point of 30 dmm to 45 dmm as measured according to ASTM D-5. In some embodiments, the asphalt filled coating has a penetration point of 32 dmm to 45 dmm as measured according to ASTM D-5. In some embodiments, the asphalt filled coating has a penetration point of 34 dmm to 45 dmm as measured according to ASTM D-5. In some embodiments, the asphalt filled coating has a penetration point of 36 dmm to 45 dmm as measured according to ASTM D-5. In some embodiments, the asphalt filled coating has a penetration point of 38 dmm to 45 dmm as measured according to ASTM D-5. In some embodiments, the asphalt filled coating has a penetration point of 40 dmm to 45 dmm as measured according to ASTM D-5. In some embodiments, the asphalt filled coating has a penetration point of 42 dmm to 45 dmm as measured according to ASTM D-5. In some embodiments, the asphalt filled coating has a penetration point of 44 dmm to 45 dmm as measured according to ASTM D-5.

In some embodiments, the asphalt filled coating has a penetration point of 15 dmm to 44 dmm as measured according to ASTM D-5. In some embodiments, the asphalt filled coating has a penetration point of 15 dmm to 42 dmm as measured according to ASTM D-5. In some embodiments, the asphalt filled coating has a penetration point of 15 dmm to 40 dmm as measured according to ASTM D-5. In some embodiments, the asphalt filled coating has a penetration point of 15 dmm to 38 dmm as measured according to ASTM D-5. In some embodiments, the asphalt filled coating has a penetration point of 15 dmm to 36 dmm as measured according to ASTM D-5. In some embodiments, the asphalt filled coating has a penetration point of 15 dmm to 34 dmm as measured according to ASTM D-5. In some embodiments, the asphalt filled coating has a penetration point of 15 dmm to 32 dmm as measured according to ASTM D-5. In some embodiments, the asphalt filled coating has a penetration point of 15 dmm to 30 dmm as measured according to ASTM D-5. In some embodiments, the asphalt filled coating has a penetration point of 15 dmm to 28 dmm as measured according to ASTM D-5. In some embodiments, the asphalt filled coating has a penetration point of 15 dmm to 26 dmm as measured according to ASTM D-5. In some embodiments, the asphalt filled coating has a penetration point of 15 dmm to 24 dmm as measured according to ASTM D-5. In some embodiments, the asphalt filled coating has a penetration point of 15 dmm to 22 dmm as measured according to ASTM D-5. In some embodiments, the asphalt filled coating has a penetration point of 15 dmm to 20 dmm as measured according to ASTM D-5. In some embodiments, the asphalt filled coating has a penetration point of 15 dmm to 18 dmm as measured according to ASTM D-5. In some embodiments, the asphalt filled coating has a penetration point of 15 dmm to 16 dmm as measured according to ASTM D-5.

In some embodiments, the asphalt filled coating has a softening point of 190° F. to 250° F. as measured according to ASTM D-3461. In some embodiments, the asphalt filled coating has a softening point of 195° F. to 250° F. as measured according to ASTM D-3461. In some embodiments, the asphalt filled coating has a softening point of 200° F. to 250° F. as measured according to ASTM D-3461. In some embodiments, the asphalt filled coating has a softening point of 205° F. to 250° F. as measured according to ASTM D-3461. In some embodiments, the asphalt filled coating has a softening point of 210° F. to 250° F. as measured according to ASTM D-3461. In some embodiments, the asphalt filled coating has a softening point of 215° F. to 250° F. as measured according to ASTM D-3461. In some embodiments, the asphalt filled coating has a softening point of 220° F. to 250° F. as measured according to ASTM D-3461. In some embodiments, the asphalt filled coating has a softening point of 225° F. to 250° F. as measured according to ASTM D-3461. In some embodiments, the asphalt filled coating has a softening point of 230° F. to 250° F. as measured according to ASTM D-3461. In some embodiments, the asphalt filled coating has a softening point of 235° F. to 250° F. as measured according to ASTM D-3461. In some embodiments, the asphalt filled coating has a softening point of 240° F. to 250° F. as measured according to ASTM D-3461. In some embodiments, the asphalt filled coating has a softening point of 245° F. to 250° F. as measured according to ASTM D-3461.

In some embodiments, the asphalt filled coating has a softening point of 190° F. to 245° F. as measured according to ASTM D-3461. In some embodiments, the asphalt filled coating has a softening point of 190° F. to 240° F. as measured according to ASTM D-3461. In some embodiments, the asphalt filled coating has a softening point of 190° F. to 235° F. as measured according to ASTM D-3461. In some embodiments, the asphalt filled coating has a softening point of 190° F. to 230° F. as measured according to ASTM D-3461. In some embodiments, the asphalt filled coating has a softening point of 190° F. to 225° F. as measured according to ASTM D-3461. In some embodiments, the asphalt filled coating has a softening point of 190° F. to 220° F. as measured according to ASTM D-3461. In some embodiments, the asphalt filled coating has a softening point of 190° F. to 215° F. as measured according to ASTM D-3461. In some embodiments, the asphalt filled coating has a softening point of 190° F. to 210° F. as measured according to ASTM D-3461. In some embodiments, the asphalt filled coating has a softening point of 190° F. to 205° F. as measured according to ASTM D-3461. In some embodiments, the asphalt filled coating has a softening point of 190° F. to 200° F. as measured according to ASTM D-3461. In some embodiments, the asphalt filled coating has a softening point of 190° F. to 195° F. as measured according to ASTM D-3461.

In some embodiments, the roofing material comprises granules. In some embodiments, the roofing material comprises a plurality of granules. In some embodiments, the granules are located on the asphalt filled coating. In some embodiments, the granules are at least partially embedded in the asphalt filled coating. In some embodiments, the granules cover at least a portion of the asphalt filled coating. In some embodiments, the granules substantially cover the asphalt filled coating. For example, in some embodiments, the granules cover 80% to 99% of the asphalt filled coating. In some embodiments, the granules cover the asphalt filled coating in its entirety. In some embodiments, the granules directly contact the asphalt filled coating.

In some embodiments, each of the granules comprises a base particle and a colored coating on a surface of the base particle. In some embodiments, the base particle comprises at least one of greenstone, rhyolite, andesite, basalt, meta-basalt, nepheline syenite, ceramic grog, talc, slag, silica sand, greystone, trap rock, granite, siliceous sand, porphyry, marble, syenite, diabase, quartz, slate, sandstone, marine shells, or any combination thereof. In some embodiments, the granule contains an algal or microbial growth inhibitor. In some embodiments, the colored coating comprises a colorant. In some embodiments, the colorant comprises at least one of a pigment, a dye, or any combination thereof. In some embodiments, the colored coating comprises at least one of a reflective pigment, a transition metal oxide, a cool pigment, a metallic pigment, a metallic particle, a mirrored pigment, a light scattering additive, an opacifier, a thin-film coated particle, a near infrared-reflecting pigment, light-interference platelet pigment, a silica pigment, a metal flake pigment, an inorganic pigment, or any combination thereof. Non-limiting examples of pigments and dyes include, without limitation, at least one of an infrared reflective pigment/dye, a phosphorescence pigment/dye, a fluorescence pigment/dye, or any combination thereof. In some embodiments, the colored coating comprises at least one of $TiO_2$, alumina, silica, iron oxide, tin oxide, $SiO_2$, aluminum oxide, mica, rutile, anatase, alloys, aluminum, iron, copper, brass, titanium, cobalt, stainless steel, chromium, nickel, or any combination thereof. In some embodiments, the colored coating comprises water.

In some embodiments, the roofing material comprises 1 granule to 100,000 granules. In some embodiments, the roofing material comprises 1 granule to 10,000 granules. In some embodiments, the roofing material comprises 1 granule to 9,000 granules. In some embodiments, the roofing material comprises 1 granule to 8,000 granules. In some embodiments, the roofing material comprises 1 granule to 7,000 granules. In some embodiments, the roofing material comprises 1 granule to 6,000 granules. In some embodiments, the roofing material comprises 1 granule to 5,000 granules. In some embodiments, the roofing material comprises 1 granule to 4,000 granules. In some embodiments, the roofing material comprises 1 granule to 3,000 granules. In some embodiments, the roofing material comprises 1 granule to 2,000 granules. In some embodiments, the roofing material comprises 1 granule to 1,000 granules. In some embodiments, the roofing material comprises 1,000 granules to 10,000 granules. In some embodiments, the roofing material comprises 2,000 granules to 10,000 granules. In some embodiments, the roofing material comprises 3,000 granules to 10,000 granules. In some embodiments, the roofing material comprises 4,000 granules to 10,000 granules. In some embodiments, the roofing material comprises 5,000 granules to 10,000 granules. In some embodiments, the roofing material comprises 6,000 granules to 10,000 granules. In some embodiments, the roofing material comprises 7,000 granules to 10,000 granules. In some embodiments, the roofing material comprises 8,000 granules to 10,000 granules. In some embodiments, the roofing material comprises 9,000 granules to 10,000 granules.

Some embodiments relate to a roofing system. In some embodiments, the roofing system comprises a roofing substrate. In some embodiments, the roofing substrate comprises at least one of a plywood substrate, a glass substrate, a cellulosic substrate, a roof shingle, a mat, a fabric, a glass mat, a fiberglass mat, an underlayment, a roofing membrane, a roof deck, a photovoltaic (PV) panel, a modified bitumen (MODBIT) substrate, a roll good, a polyisocyanurate (ISO) foam board, a cover board, a pipe, a base sheet, a chimney, a wax paper, or any combination thereof. In some embodiments, the roofing substrate is, for example, a roof deck. In some embodiments, the roofing substrate is an underlayment. In some embodiments, the roofing substrate is a board. It will be appreciated that other roofing substrates may be used herein without departing from the scope of this disclosure.

In some embodiments, the roofing system comprises at least one roofing shingle. In some embodiments, the at least one roofing shingle is located on the roofing substrate. In some embodiments, the at least one roofing shingle directly contacts the roofing substrate. In some embodiments, the at least one roofing shingle is secured to the roofing substrate. In some embodiments, the at least one roofing shingle is fastened to the roofing substrate (e.g., via a mechanical fastener, such as, for example and without limitation, nails, screws, and the like). In some embodiments, an intervening layer is located between the at least one roofing shingle and the roofing substrate. Any of the roofing shingles disclosed herein may be used, without departing from the scope of this disclosure. For example, in some embodiments, the at least one roofing shingle comprises a substrate, and an asphalt filled coating on the substrate. In some embodiments, the asphalt filled coating comprises an asphalt, a polymer modifier, and an asphalt shingle waste. In some embodiments, the at least one roofing shingle comprises granules on the asphalt filled coating.

FIG. 1 is a schematic diagram of a roofing material 100, according to some embodiments. In some embodiments, the roofing material 100 is a roofing shingle. In some embodiments, the roofing material 100 comprises a substrate 102. In some embodiments, the roofing material 100 comprises an asphalt filled coating 104 located on or above a top surface of the substrate 102. In some embodiments, the asphalt filled coating 104 covers the top surface of the substrate 102. In some embodiments, the asphalt filled coating 104 directly contacts the top surface of the substrate 102. In some embodiments, the asphalt filled coating 104 impregnates the top surface of the substrate 102. In some embodiments, the asphalt filled coating 104 is adhered to the top surface of the substrate 102. In some embodiments, the asphalt filled coating 104 is bonded to the top surface of the substrate 102. In some embodiments, the roofing material 100 comprises an asphalt filled coating 106 located on or above a bottom surface of the substrate. In some embodiments, the roofing material 100 comprises an intervening layer between the asphalt filled coating 104 and the substrate 102. In some embodiments, the asphalt filled coating 106 covers the bottom surface of the substrate 102. In some embodiments, the asphalt filled coating 106 directly contacts the bottom surface of the substrate 102. In some embodiments, the asphalt filled coating 106 impregnates the bottom surface of the substrate 102. In some embodiments, the asphalt filled coating 106 is adhered to the bottom surface of the substrate 102. In some embodiments, the asphalt filled coating 106 is bonded to the bottom surface of the substrate 102. In some embodiments, the roofing material 100 comprises an intervening layer between the asphalt filled coating 106 and the substrate 102. In some embodiments, the roofing material 100 comprises granules 108 located on or above the asphalt filled coating 104. In some embodiments, the granules 108 directly contacts the asphalt filled coating 104. In some embodiments, the granules is embedded in the asphalt filled coating 104.

Figure 2:
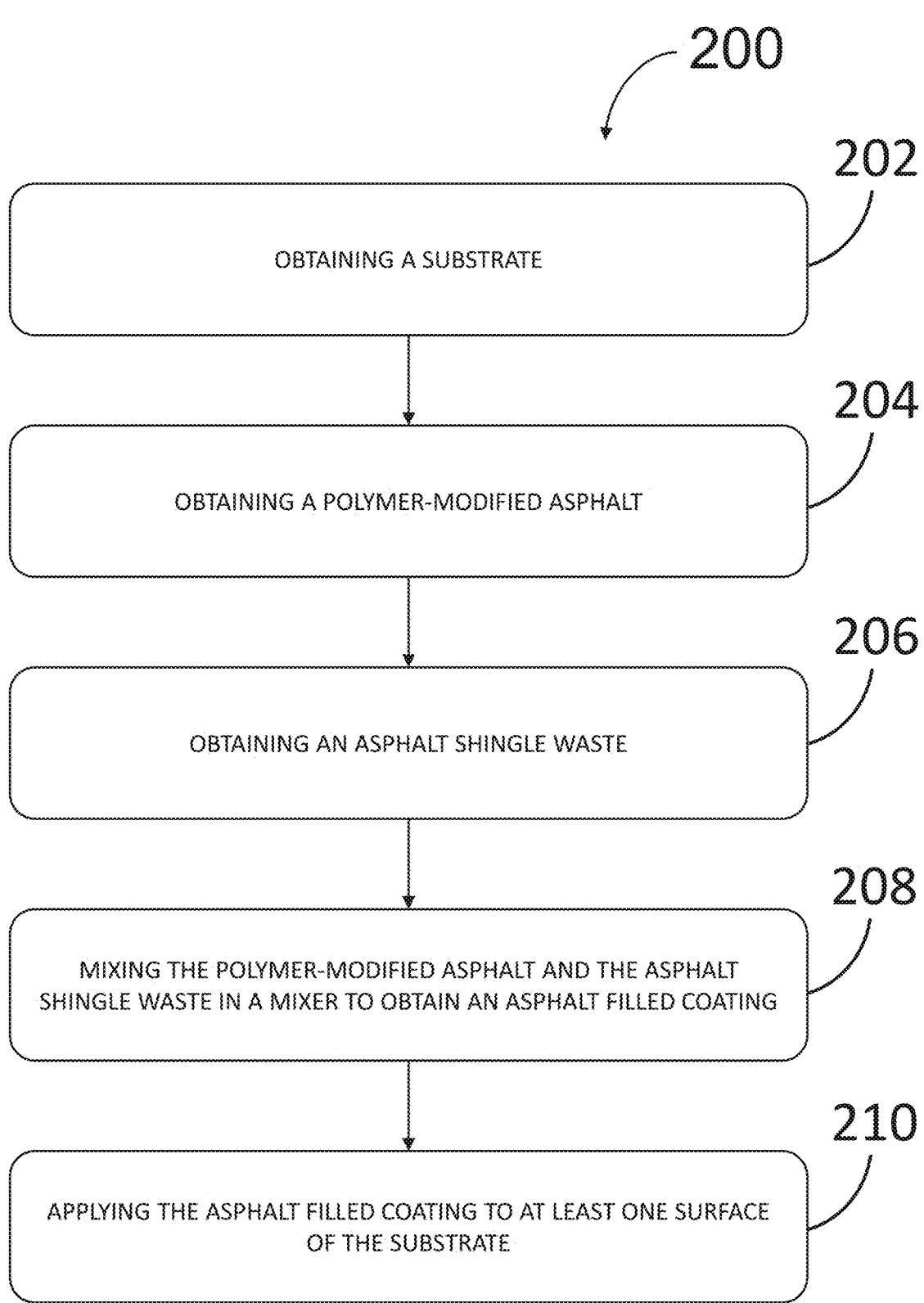
FIG. 2 is a flowchart of a method of manufacturing a roofing material, according to some embodiments.

FIG. 2 is a flowchart of a method of manufacturing a roofing material 200, according to some embodiments. As shown in FIG. 2, the method of manufacturing a roofing material may comprise one or more of the following steps: obtaining 202 a substrate; obtaining 204 a polymer-modified asphalt (e.g., comprising an asphalt and a polymer modifier); obtaining 206 an asphalt shingle waste; mixing 208 the polymer-modified asphalt and the asphalt shingle waste in a mixer to obtain an asphalt filled coating; and applying 210 the asphalt filled coating to at least one surface of the substrate. Any of the asphalt filled coatings disclosed herein may be used, without departing from the scope of this disclosure. In some embodiments, the method of manufacturing 200 further comprises obtaining granules and applying the granules to the asphalt filled coating.

In some embodiments, the roofing material is configured to be prepared on a substantially standard manufacturing line for asphaltic shingles at a standard speed, ranging from 110 FPM to 1000 FPM. In some embodiments, the roofing material is configured to be prepared on a substantially standard manufacturing line for asphaltic shingles at a standard speed, ranging from 200 FPM to 1000 FPM. In some embodiments, the roofing material is configured to be prepared on a substantially standard manufacturing line for asphaltic shingles at a standard speed, ranging from 350 FPM to 1000 FPM. In some embodiments, the roofing material is configured to be prepared on a substantially standard manufacturing line for asphaltic shingles at a standard speed, ranging from 500 FPM to 1000 FPM. In some embodiments, the roofing material is configured to be prepared on a substantially standard manufacturing line for asphaltic shingles at a standard speed, ranging from 600 FPM to 1000 FPM. In some embodiments, the roofing material is configured to be prepared on a substantially standard manufacturing line for asphaltic shingles at a standard speed, ranging from 750 FPM to 1000 FPM. In some embodiments, the roofing material is configured to be prepared on a substantially standard manufacturing line for asphaltic shingles at a standard speed, ranging from 900 FPM to 1000 FPM. A non-limiting example of a substantially standard manufacturing line for asphaltic shingles is detailed in U.S. Pat. No. 10,195,640, the contents of which are hereby incorporated reference. In some embodiments, the roofing material is configured to be prepared on a manufacturing line for asphaltic shingles at a speed of 100 FPM to 10,000 FPM, 100 FPM to 9,000 FPM, 100 FPM to 8,000 FPM, 100 FPM to 7,000 FPM, 100 FPM to 6,000 FPM, 100 FPM to 5,000 FPM, 100 FPM to 4,000 FPM, 100 FPM to 3,000 FPM, 100 FPM to 2,000 FPM, or 100 FPM to 1,000 FPM.

At step 202, the method of manufacturing a roofing material comprises obtaining a substrate. Any of the substrates disclosed herein may be used without departing from the scope of this disclosure.

At step 204, the method of manufacturing a roofing material comprises obtaining a polymer-modified asphalt. Any of the polymer-modified asphalts, polymer modifiers, and asphalts disclosed herein may be used without departing from the scope of this disclosure. In some embodiments, the step of obtaining the polymer-modified asphalt comprises obtaining the asphalt and the polymer modifier. In some embodiments, the step of obtaining the polymer-modified asphalt comprises contacting the asphalt and the polymer modifier. In some embodiments, the step of obtaining the polymer-modified asphalt comprises mixing the asphalt and the polymer modifier. In some embodiments, the step of obtaining the polymer-modified asphalt comprises reacting the asphalt and the polymer modifier. In some embodiments, the polymer-modified asphalt is preformed such that the polymer-modified asphalt already comprises the asphalt and the polymer modifier.

At step 206, the method of manufacturing a roofing material comprises obtaining an asphalt shingle waste. Any of the asphalt shingle wastes disclosed herein may be used without departing from the scope of this disclosure. In some embodiments, the step of obtaining the asphalt shingle waste comprises obtaining an asphalt shingle waste briquette. In some embodiments, the step of obtaining the asphalt shingle waste comprises obtaining an asphalt shingle waste briquette comprising an asphalt shingle waste powder. In some embodiments, the step of obtaining the asphalt shingle waste comprises obtaining an asphalt shingle waste powder. In some embodiments, the step of obtaining the asphalt shingle waste comprises obtaining an asphalt shingle waste pellet.

In some embodiments, the asphalt shingle waste has an average particle size of 2 microns to 6350 microns. In some embodiments, the asphalt shingle waste has an average particle size of 2 microns to 6250 microns. In some embodiments, the asphalt shingle waste has an average particle size of 2 microns to 6000 microns. In some embodiments, the asphalt shingle waste has an average particle size of 2 microns to 5750 microns. In some embodiments, the asphalt shingle waste has an average particle size of 2 microns to 5500 microns. In some embodiments, the asphalt shingle waste has an average particle size of 2 microns to 5250 microns. In some embodiments, the asphalt shingle waste has an average particle size of 2 microns to 5000 microns. In some embodiments, the asphalt shingle waste has an average particle size of 2 microns to 4750 microns. In some embodiments, the asphalt shingle waste has an average particle size of 2 microns to 4500 microns. In some embodiments, the asphalt shingle waste has an average particle size of 2 microns to 4250 microns. In some embodiments, the asphalt shingle waste has an average particle size of 2 microns to 4000 microns. In some embodiments, the asphalt shingle waste has an average particle size of 2 microns to 3750 microns. In some embodiments, the asphalt shingle waste has an average particle size of 2 microns to 3500 microns. In some embodiments, the asphalt shingle waste has an average particle size of 2 microns to 3250 microns. In some embodiments, the asphalt shingle waste has an average particle size of 2 microns to 3000 microns. In some embodiments, the asphalt shingle waste has an average particle size of 2 microns to 2750 microns. In some embodiments, the asphalt shingle waste has an average particle size of 2 microns to 2500 microns. In some embodiments, the asphalt shingle waste has an average particle size of 2 microns to 2250 microns. In some embodiments, the asphalt shingle waste has an average particle size of 2 microns to 2000 microns. In some embodiments, the asphalt shingle waste has an average particle size of 2 microns to 1750 microns. In some embodiments, the asphalt shingle waste has an average particle size of 2 microns to 1500 microns. In some embodiments, the asphalt shingle waste has an average particle size of 2 microns to 1250 microns. In some embodiments, the asphalt shingle waste has an average particle size of 2 microns to 1000 microns. In some embodiments, the asphalt shingle waste has an average particle size of 2 microns to 750 microns. In some embodiments, the asphalt shingle waste has an average particle size of 2 microns to 500 microns.

In some embodiments, the asphalt shingle waste has an average particle size of 2 microns to 450 microns. In some embodiments, the asphalt shingle waste has an average particle size of 2 microns to 425 microns. In some embodiments, the asphalt shingle waste has an average particle size of 2 microns to 400 microns. In some embodiments, the asphalt shingle waste has an average particle size of 2 microns to 375 microns. In some embodiments, the asphalt shingle waste has an average particle size of 2 microns to 350 microns. In some embodiments, the asphalt shingle waste has an average particle size of 2 microns to 325 microns. In some embodiments, the asphalt shingle waste has an average particle size of 2 microns to 300 microns. In some embodiments, the asphalt shingle waste has an average particle size of 2 microns to 275 microns. In some embodiments, the asphalt shingle waste has an average particle size of 2 microns to 250 microns. In some embodiments, the asphalt shingle waste has an average particle size of 2 microns to 225 microns. In some embodiments, the asphalt shingle waste has an average particle size of 2 microns to 200 microns. In some embodiments, the asphalt shingle waste has an average particle size of 2 microns to 175 microns. In some embodiments, the asphalt shingle waste has an average particle size of 2 microns to 150 microns. In some embodiments, the asphalt shingle waste has an average particle size of 2 microns to 125 microns. In some embodiments, the asphalt shingle waste has an average particle size of 2 microns to 100 microns. In some embodiments, the asphalt shingle waste has an average particle size of 2 microns to 75 microns. In some embodiments, the asphalt shingle waste has an average particle size of 2 microns to 50 microns. In some embodiments, the asphalt shingle waste has an average particle size of 2 microns to 25 microns. In some embodiments, the asphalt shingle waste has an average particle size of 2 microns to 10 microns. In some embodiments, the asphalt shingle waste has an average particle size of 2 microns to 5 microns.

In some embodiments, the asphalt shingle waste has an average particle size of 25 microns to 6350 microns. In some embodiments, the asphalt shingle waste has an average particle size of 25 microns to 6350 microns. In some embodiments, the asphalt shingle waste has an average particle size of 50 microns to 6350 microns. In some embodiments, the asphalt shingle waste has an average particle size of 75 microns to 6350 microns. In some embodiments, the asphalt shingle waste has an average particle size of 100 microns to 6350 microns. In some embodiments, the asphalt shingle waste has an average particle size of 250 microns to 6350 microns. In some embodiments, the asphalt shingle waste has an average particle size of 500 microns to 6350 microns. In some embodiments, the asphalt shingle waste has an average particle size of 750 microns to 6350 microns. In some embodiments, the asphalt shingle waste has an average particle size of 1000 microns to 6350 microns. In some embodiments, the asphalt shingle waste has an average particle size of 1250 microns to 6350 microns. In some embodiments, the asphalt shingle waste has an average particle size of 1500 microns to 6350 microns. In some embodiments, the asphalt shingle waste has an average particle size of 1750 microns to 6350 microns. In some embodiments, the asphalt shingle waste has an average particle size of 2000 microns to 6350 microns. In some embodiments, the asphalt shingle waste has an average particle size of 2250 microns to 6350 microns. In some embodiments, the asphalt shingle waste has an average particle size of 2500 microns to 6350 microns. In some embodiments, the asphalt shingle waste has an average particle size of 2750 microns to 6350 microns. In some embodiments, the asphalt shingle waste has an average particle size of 3000 microns to 6350 microns. In some embodiments, the asphalt shingle waste has an average particle size of 3250 microns to 6350 microns. In some embodiments, the asphalt shingle waste has an average particle size of 3500 microns to 6350 microns. In some embodiments, the asphalt shingle waste has an average particle size of 3750 microns to 6350 microns. In some embodiments, the asphalt shingle waste has an average particle size of 3000 microns to 6350 microns. In some embodiments, the asphalt shingle waste has an average particle size of 4250 microns to 6350 microns. In some embodiments, the asphalt shingle waste has an average particle size of 4500 microns to 6350 microns. In some embodiments, the asphalt shingle waste has an average particle size of 4750 microns to 6350 microns. In some embodiments, the asphalt shingle waste has an average particle size of 5000 microns to 6350 microns. In some embodiments, the asphalt shingle waste has an average particle size of 5250 microns to 6350 microns. In some embodiments, the asphalt shingle waste has an average particle size of 5500 microns to 6350 microns. In some embodiments, the asphalt shingle waste has an average particle size of 5750 microns to 6350 microns. In some embodiments, the asphalt shingle waste has an average particle size of 6000 microns to 6350 microns. In some embodiments, the asphalt shingle waste has an average particle size of 6250 microns to 6350 microns.

In some embodiments, the asphalt shingle waste has an average particle size of 25 microns to 425 microns. In some embodiments, the asphalt shingle waste has an average particle size of 50 microns to 425 microns. In some embodiments, the asphalt shingle waste has an average particle size of 75 microns to 425 microns. In some embodiments, the asphalt shingle waste has an average particle size of 100 microns to 425 microns. In some embodiments, the asphalt shingle waste has an average particle size of 125 microns to 425 microns. In some embodiments, the asphalt shingle waste has an average particle size of 150 microns to 425 microns. In some embodiments, the asphalt shingle waste has an average particle size of 175 microns to 425 microns. In some embodiments, the asphalt shingle waste has an average particle size of 200 microns to 425 microns. In some embodiments, the asphalt shingle waste has an average particle size of 225 microns to 425 microns. In some embodiments, the asphalt shingle waste has an average particle size of 250 microns to 425 microns. In some embodiments, the asphalt shingle waste has an average particle size of 275 microns to 425 microns. In some embodiments, the asphalt shingle waste has an average particle size of 300 microns to 425 microns. In some embodiments, the asphalt shingle waste has an average particle size of 325 microns to 425 microns. In some embodiments, the asphalt shingle waste has an average particle size of 350 microns to 425 microns. In some embodiments, the asphalt shingle waste has an average particle size of 375 microns to 425 microns. In some embodiments, the asphalt shingle waste has an average particle size of 400 microns to 425 microns.

In some embodiments, when the asphalt shingle waste is provided in a form of a briquette, the asphalt shingle waste has a shape. In some embodiments, the asphalt shingle waste briquette is spherical. In some embodiments, the asphalt shingle waste briquette is an oblate spheroid (i.e., an ellipsoid). In some embodiments, the asphalt shingle waste briquettes have at least one of the following non-limiting shapes: a rectangular prism, a cube, a cone, a tetrahedron, a pentahedron, a hexahedron, a dodecahedron, a torus, or any combination thereof.

The asphalt shingle waste briquette may have any size. In some embodiments, the asphalt shingle waste briquette may be spherical with a diameter in a range of 0.5 inches to 2 inches. In some embodiments, the asphalt shingle waste briquette may be spherical with a diameter in a range of 1 inch to 2 inches. In some embodiments, the asphalt shingle waste briquette may be spherical with a diameter in a range of 1.5 inches to 2 inches. In some embodiments, the asphalt shingle waste briquette may be spherical with a diameter in a range of 0.5 inches to 1.5 inches. In some embodiments, the asphalt shingle waste briquette may be spherical with a diameter in a range of 0.5 inches to 1 inch. In some embodiments, the asphalt shingle waste briquette may be spherical with a diameter in a range of 1 inch to 1.5 inches.

In some embodiments, the asphalt shingle waste briquette may be an oblate spheroid with at least one of: a first diameter, a second diameter, or any combination thereof having a range of 0.5 inches to 2 inches. In some embodiments, the asphalt shingle waste briquette may be an oblate spheroid with at least one of: a first diameter, a second diameter, or any combination thereof having a range of 1 inch to 2 inches. In some embodiments, the asphalt shingle waste briquette may be an oblate spheroid with at least one of: a first diameter, a second diameter, or any combination thereof having a range of 1.5 inches to 2 inches In some embodiments, the asphalt shingle waste briquette may be an oblate spheroid with at least one of: a first diameter, a second diameter, or any combination thereof having a range of 0.5 inches to 1.5 inches In some embodiments, the asphalt shingle waste briquette may be an oblate spheroid with at least one of: a first diameter, a second diameter, or any combination thereof having a range of 0.5 inches to 1 inch. In some embodiments, the asphalt shingle waste briquette may be an oblate spheroid with at least one of: a first diameter, a second diameter, or any combination thereof having a range of 1 inch to 1.5 inches.

At step 208, the method of manufacturing a roofing material comprises mixing the polymer-modified asphalt and the asphalt shingle waste in a mixer to obtain an asphalt filled coating. In one embodiment, the step of mixing the polymer-modified asphalt and the asphalt shingle waste in a mixer to obtain an asphalt filled coating is conducted on a substantially standard manufacturing line for asphaltic shingles at a standard speed, ranging from 110 FPM to 1000 FPM. In some embodiments, the mixing comprises at least one of contacting, combining, agitating, stirring, tumbling, sonicating, or any combination thereof, among other techniques for mixing two or more components together. In some embodiments, the mixer is a low shear mixer. In some embodiments, the mixer is a high shear mixer. In some embodiments, the asphalt filled coating is prepared by mixing the various components using at least one of static mixing, a low shear mixer, a high shear mixer, or any combination thereof. A non-limiting example of a low shear mixer is EUROSTAR® 60 Digital, IKA Works, Inc., Wilmington, NC, which mixes batches at about 500 to 1500 RPM, with a paddle-type blade to generate low shear. A non-limiting example of a high shear mixer is SILVERSON® L5M-A Laboratory Mixer, Silverson Machines, Inc., East Longmeadow, MA, which mixes batches at or above 3200 RPM, with a blade and a head that are configured to generate high shear, as well as heat mixing. In some embodiments, the mixing of the asphalt filled coating is conducted at an ambient temperature (e.g., about 70° Fahrenheit). In some embodiments, the mixing is conducted at a temperature of 300° F. to 425° F. In some embodiments, after mixing, the asphalt filled coating is allowed to dry at an ambient temperature (e.g., about 70° Fahrenheit). In another embodiment, after mixing, the asphalt filled coating is dried in an oven at about 90° F. to 140° F.

In some embodiments, the mixing is conducted at a temperature of 300° F. to 450° F. In some embodiments, the mixing is conducted at a temperature of 305° F. to 450° F. In some embodiments, the mixing is conducted at a temperature of 310° F. to 450° F. In some embodiments, the mixing is conducted at a temperature of 315° F. to 450° F. In some embodiments, the mixing is conducted at a temperature of 320° F. to 450° F. In some embodiments, the mixing is conducted at a temperature of 325° F. to 450° F. In some embodiments, the mixing is conducted at a temperature of 330° F. to 450° F. In some embodiments, the mixing is conducted at a temperature of 335° F. to 450° F. In some embodiments, the mixing is conducted at a temperature of 340° F. to 450° F. In some embodiments, the mixing is conducted at a temperature of 345° F. to 450° F. In some embodiments, the mixing is conducted at a temperature of 350° F. to 450° F. In some embodiments, the mixing is conducted at a temperature of 355° F. to 450° F. In some embodiments, the mixing is conducted at a temperature of 360° F. to 450° F. In some embodiments, the mixing is conducted at a temperature of 365° F. to 450° F. In some embodiments, the mixing is conducted at a temperature of 370° F. to 450° F. In some embodiments, the mixing is conducted at a temperature of 375° F. to 450° F. In some embodiments, the mixing is conducted at a temperature of 380° F. to 450° F. In some embodiments, the mixing is conducted at a temperature of 385° F. to 450° F. In some embodiments, the mixing is conducted at a temperature of 390° F. to 450° F. In some embodiments, the mixing is conducted at a temperature of 395° F. to 450° F. In some embodiments, the mixing is conducted at a temperature of 400° F. to 450° F. In some embodiments, the mixing is conducted at a temperature of 405° F. to 450° F. In some embodiments, the mixing is conducted at a temperature of 410° F. to 450° F. In some embodiments, the mixing is conducted at a temperature of 415° F. to 450° F. In some embodiments, the mixing is conducted at a temperature of 420° F. to 450° F.

In some embodiments, the mixing is conducted at a temperature of 300° F. to 305° F. In some embodiments, the mixing is conducted at a temperature of 300° F. to 310° F. In some embodiments, the mixing is conducted at a temperature of 300° F. to 315° F. In some embodiments, the mixing is conducted at a temperature of 300° F. to 320° F. In some embodiments, the mixing is conducted at a temperature of 300° F. to 325° F. In some embodiments, the mixing is conducted at a temperature of 300° F. to 330° F. In some embodiments, the mixing is conducted at a temperature of 300° F. to 335° F. In some embodiments, the mixing is conducted at a temperature of 300° F. to 340° F. In some embodiments, the mixing is conducted at a temperature of 300° F. to 345° F. In some embodiments, the mixing is conducted at a temperature of 300° F. to 350° F. In some embodiments, the mixing is conducted at a temperature of 300° F. to 355° F. In some embodiments, the mixing is conducted at a temperature of 300° F. to 360° F. In some embodiments, the mixing is conducted at a temperature of 300° F. to 365° F. In some embodiments, the mixing is conducted at a temperature of 300° F. to 370° F. In some embodiments, the mixing is conducted at a temperature of 300° F. to 375° F. In some embodiments, the mixing is conducted at a temperature of 300° F. to 380° F. In some embodiments, the mixing is conducted at a temperature of 300° F. to 385° F. In some embodiments, the mixing is conducted at a temperature of 300° F. to 390° F. In some embodiments, the mixing is conducted at a temperature of 300° F. to 395° F. In some embodiments, the mixing is conducted at a temperature of 300° F. to 400° F. In some embodiments, the mixing is conducted at a temperature of 300° F. to 405° F. In some embodiments, the mixing is conducted at a temperature of 300° F. to 410° F. In some embodiments, the mixing is conducted at a temperature of 300° F. to 415° F. In some embodiments, the mixing is conducted at a temperature of 300° F. to 420° F. In some embodiments, the mixing is conducted at a temperature of 300° F. to 425° F. In some embodiments, the mixing is conducted at a temperature of 300° F. to 450° F.

In some embodiments, the mixing is conducted in an extruder and/or a high shear mixer at 330° F. to 425° F., and then the resulting asphalt filled coating is discharged from the high shear mixer at 330° F. to 410° F. and roll pressed into sheets. In some embodiments, the asphalt filled coating is discharged from the mixer at a temperature of 330° F. to 400° F. In some embodiments, the asphalt filled coating is discharged from the mixer at a temperature of 330° F. to 390° F. In some embodiments, the asphalt filled coating is discharged from the mixer at a temperature of 330° F. to 380° F. In some embodiments, the asphalt filled coating is discharged from the mixer at a temperature of 330° F. to 375° F. In some embodiments, the asphalt filled coating is discharged from the mixer at a temperature of 330° F. to 360° F. In some embodiments, the asphalt filled coating is discharged from the mixer at a temperature of 330° F. to 350° F. In some embodiments, the asphalt filled coating is discharged from the mixer at a temperature of 330° F. to 340° F. In some embodiments, the asphalt filled coating is pressed into a glass mat. According to one embodiment, once the asphalt filled coating is roll pressed, it is capped with granules and cut to the desired shape.

In some embodiments, the asphalt filled coating is in the form of a pourable coating formulation that is mixed at 300° F. to 425° F. or 330° F. to 410° F. in an extruder and/or low shear mixer. In some embodiments, the pourable coating formulation, which is generally at 380° F. to 420° F. after mixing, is then poured onto a glass mat on one or both sides and roll pressed to impregnate and saturate the mat. In some embodiments, granules are then applied and the roofing material (e.g., shingle(s)) is cut to the desired shape.

At step 210, the method of manufacturing a roofing material comprises applying the asphalt filled coating to at least one surface of the substrate. In some embodiments, the step of applying the asphalt filled coating to the surface of the substrate to form the roofing material is conducted on a substantially standard manufacturing line for asphaltic shingles at a standard speed, ranging from 110 FPM to 1000 FPM. In some embodiments, the applying comprises at least one of contacting, disposing, pouring, immersing, dipping, brushing, coating, spraying, or any combination thereof, among other techniques for bringing the asphalt filled coating into direct or indirect contact with the substrate.

In some embodiments, the roofing material is a roofing shingle. In some embodiments, the roofing shingle is one of (i) a single layer shingle or (ii) a laminated shingle having two or more layers.

In some embodiments, the roofing material comprises one or more layers of the coating, discussed above. In some embodiments, the roofing material comprises one (1) to two (2) layers of the coating. In some embodiments, the roofing material comprises one (1) to three (3) layers of the coating. In some embodiments, the roofing material comprises one (1) to four (4) layers of the coating. In some embodiments, the roofing material comprises one (1) to five (5) layers of the coating. In some embodiments, the roofing material comprises one (1) to six (6) layers of the coating. In some embodiments, the roofing material comprises one (1) to seven (7) layers of the coating. In some embodiments, the roofing material comprises one (1) to eight (8) layers of the coating. In some embodiments, the roofing material comprises one (1) to nine (9) layers of the coating. In some embodiments, the roofing material comprises one (1) to ten (10) layers of the coating. In some embodiments, the roofing material comprises two (2) to ten (10) layers of the coating. In some embodiments, the roofing material comprises three (3) to ten (10) layers of the coating. In some embodiments, the roofing material comprises five (5) to ten (10) layers of the coating. In some embodiments, the roofing material comprises seven (7) to ten (10) layers of the coating.

In some embodiments, the asphalt filled coating comprises at least one layer that is applied to both a top surface and a bottom surface of the substrate. In some embodiments, the asphalt filled coating is embedded in the substrate to form a coated substrate.

In some embodiments, the method of manufacturing further comprises obtaining a plurality of granules. In some embodiments, the plurality of granules are applied to a surface of the roofing material (e.g., shingle). In some embodiments, the roofing material includes mineral surfacing, such as, e.g., fines, granules, sand, metal flakes and/or reflective granules. In some embodiments, the method includes applying polymer films and/or synthetic and/or natural non-woven and/or woven fabrics, with or without decorative elements, including, for example, printing, embossing and/or protective coatings, to the coating. In some embodiments, photo (e.g., UV) and/or thermal stabilizers are added to a surface of the asphalt filled coating and/or roofing material.

Example 1

Various control samples were prepared.

A control asphalt filled coating was prepared comprising 35% by weight of an oxidized asphalt based on a total weight of the control asphalt filled coating and 65% by weight of a virgin filler based on the total weight of the control asphalt filled coating. This is reported in Table 1 below as Control A.

A control asphalt filled coating was prepared comprising 35% by weight of a polymer modified asphalt based on a total weight of the control asphalt filled coating and 65% by weight of a virgin filler based on the total weight of the control asphalt filled coating. This is reported in Table 1 below as Control B.

A control asphalt filled coating was prepared comprising 35% by weight of a polymer modified asphalt based on a total weight of the control asphalt filled coating and 65% by weight of a virgin filler based on the total weight of the control asphalt filled coating. This is reported in Table 1 below as Control C.

The polymer modifier was different in Control B and Control C.

The softening point as measured according to ASTM D-3461, the viscosity as measured according to ASTM D-4402, and the penetration point as measured according to ASTM D-5 of the resulting control asphalt filled coatings were measured and are summarized in Table 1 below.

Example 2

Various asphalt shingle wastes were combined with various polymer modified asphalts in a mechanical mixer and mixed at a temperature of 300° F. to 450° F. The amounts of the asphalt shingle waste and the amounts of the polymer modified asphalt were sufficient to result in three asphalt filled coatings—referred to in Table 1 below as Sample A, Sample B, and Sample C—each comprising 30% by weight of the polymer modified asphalt and 70% by weight of the asphalt shingle waste. Each of the Sample A, the Sample B, and the Sample C included a different polymer modifier. All weight percentages are based on the total weight of the asphalt filled coating, unless otherwise provided herein. The softening point as measured according to ASTM D-3461, the viscosity as measured according to ASTM D-4402, and the penetration point as measured according to ASTM D-5 of the resulting asphalt filled coatings were measured and are summarized in Table 1.

Example 3

A sufficient amount of an asphalt shingle waste was combined with a sufficient amount of a polymer modified asphalt and with a sufficient amount of a virgin filler, in a mechanical mixer and mixed at a temperature of 300° F. to 450° F., to result in an asphalt filled coating comprising 37.5% by weight of the polymer modified asphalt, 37.5% by weight of the asphalt shingle waste, and 25% by weight of the virgin filler. This asphalt filled coating is presented in Table 1 below as Sample D. All weight percentages are based on the total weight of the asphalt filled coating, unless otherwise provided herein. The softening point as measured according to ASTM D-3461, the viscosity as measured according to ASTM D-4402, and the penetration point as measured according to ASTM D-5 of the resulting asphalt filled coatings was measured and is summarized in Table 1.

Example 4

A sufficient amount of an asphalt shingle waste was combined with a sufficient amount of a polymer modified asphalt, in a mechanical mixer and mixed at a temperature of 300° F. to 450° F., to result in an asphalt filled coating comprising 10% by weight of the polymer modified asphalt and 90% by weight of the asphalt shingle waste. This asphalt filled coating is presented in Table 1 below as Sample E. All weight percentages are based on the total weight of the asphalt filled coating, unless otherwise provided herein. The softening point as measured according to ASTM D-3461, the viscosity as measured according to ASTM D-4402, and the penetration point as measured according to ASTM D-5 of the resulting asphalt filled coatings was measured and is summarized in Table 1.

Example 5

A sufficient amount of an asphalt shingle waste was combined with a sufficient amount of an oxidized asphalt, in a mechanical mixer and mixed at a temperature of 300° F. to 450° F., to result in an asphalt filled coating comprising 30% by weight of the oxidized asphalt and 70% by weight of the asphalt shingle waste. This asphalt filled coating is presented in Table 1 below as Sample F. All weight percentages are based on the total weight of the asphalt filled coating, unless otherwise provided herein. The softening point as measured according to ASTM D-3461, the viscosity as measured according to ASTM D-4402, and the penetration point as measured according to ASTM D-5 of the resulting asphalt filled coatings was measured and is summarized in Table 1.

TABLE 1

| | Properties of Controls and Samples | | |
| Sample | Softening Point (° F.) | Viscosity (400° F., cP) | Penetration Point (dmm) |
| --- | --- | --- | --- |
| Control A | 248 | 3011 | 11 |
| Control B | 249 | 2506 | 15 |
| Control C | 253 | 1634 | 10 |

TABLE 1-continued

| | Properties of Controls and Samples | | |
| Sample | Softening Point (° F.) | Viscosity (400° F., cP) | Penetration Point (dmm) |
| --- | --- | --- | --- |
| Sample A | 244 | 2074 | 1 |
| Sample B | 234 | 1169 | 9 |
| Sample C | 278 | 4309 | 21 |
| Sample D | 236 | 1420 | 14 |
| Sample E | 265 | 5786 | 5 |
| Sample F | 278 | 4996 | 7 |

Figure 3:
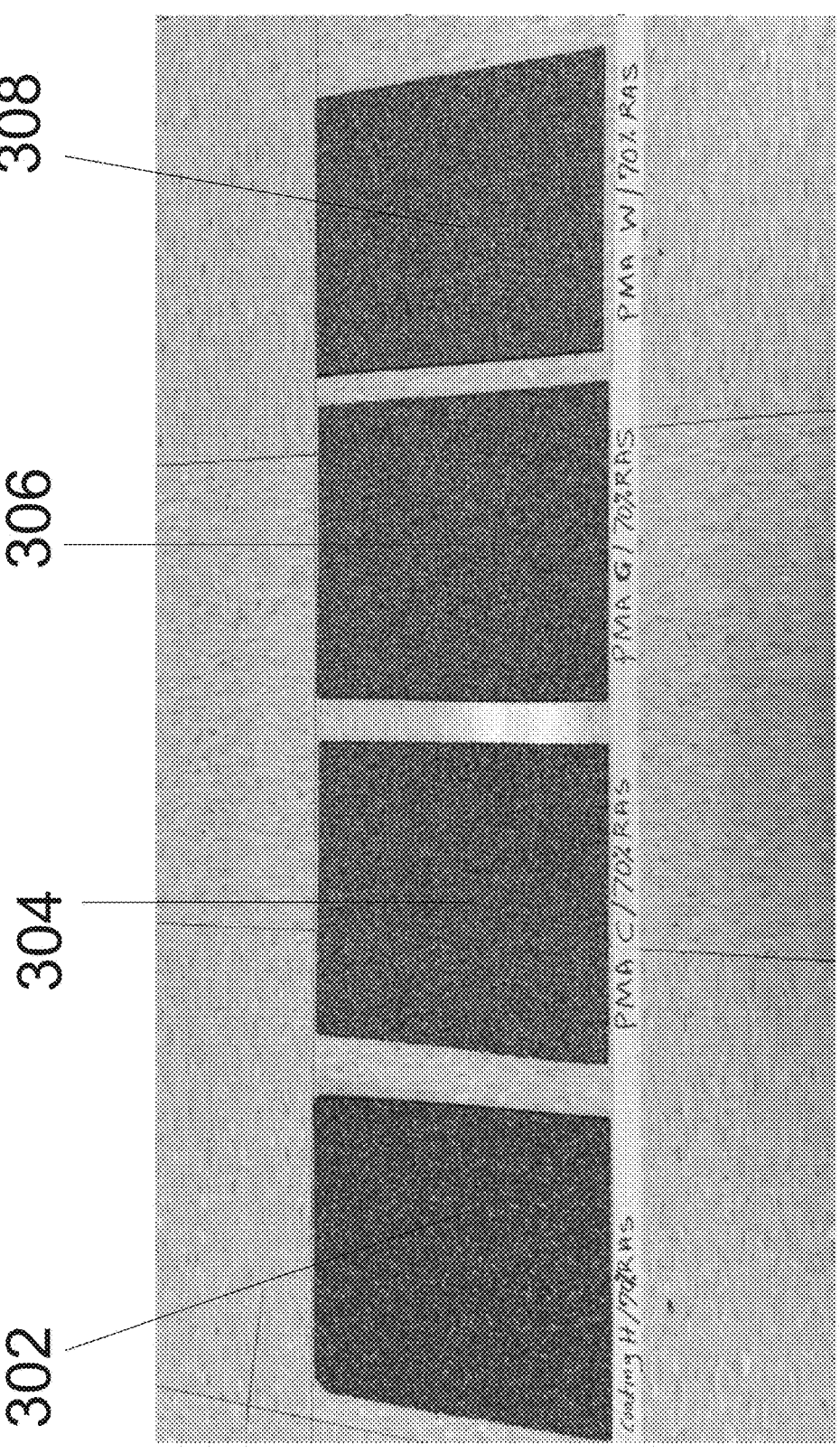
FIG. 3 is a photograph of a control and various samples on a flat surface, according to some embodiments.
Figure 4:
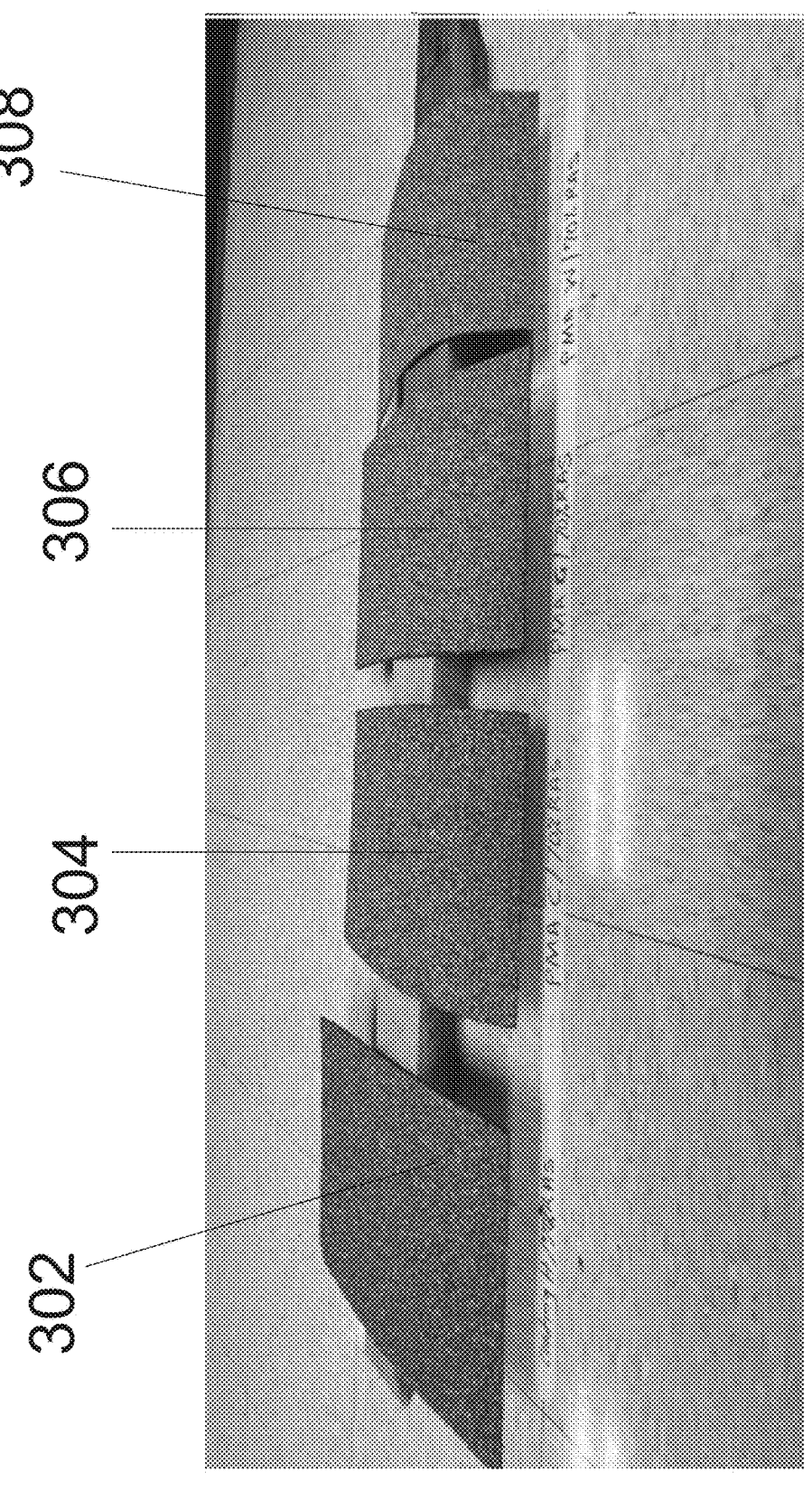
FIG. 4 is a photograph of a control and various samples on a non-flat surface, according to some embodiments.
Figure 5:
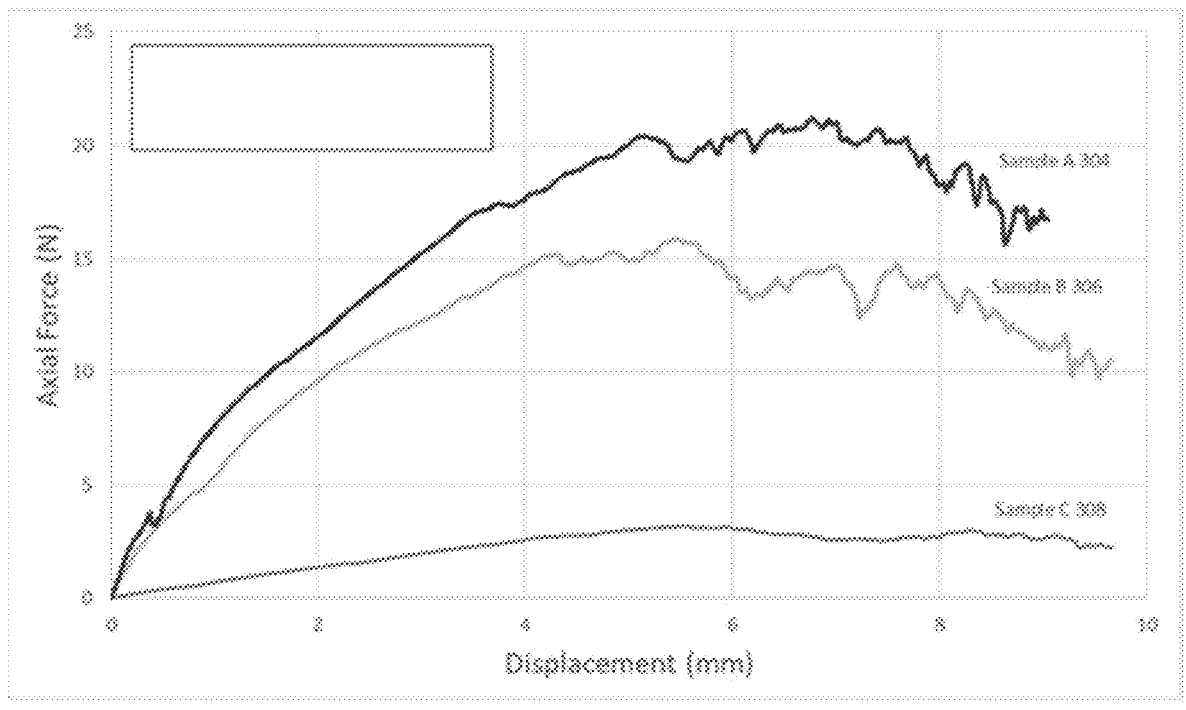
FIG. 5 is a graphical view of axial force versus displacement various samples, according to some embodiments.
Figure 6:
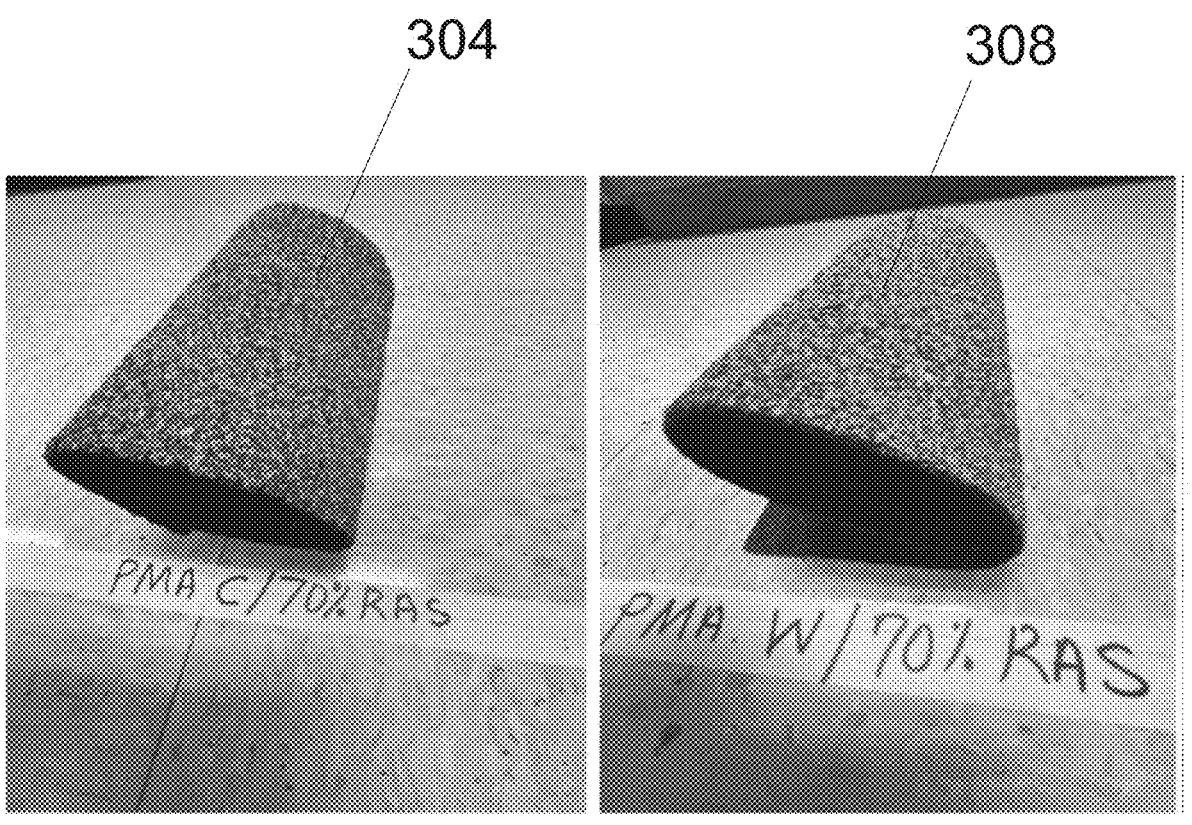
FIG. 6 is a photograph of various samples in a rolled configuration, according to some embodiments.

As shown in Table 1, polymer modified asphalt was combined with up to 90% by weight of asphalt shingle waste, without any virgin filler or with limited amounts of virgin filler, to obtain asphalt filled coatings—presented as Samples A-F—with properties that are similar to the properties of conventional asphalt filled coatings with typical loading levels of inorganic limestone filler (e.g., blown asphalt combined with virgin filler, such as limestone)—presented as Control A-C. The greater flexibility and ductility as well as the viscoelastic behavior of the asphalt filled coatings in Samples A-F resulted in a more pliable coating that can be used to produce a less rigid roofing shingle in comparison to conventional air blown asphalt coatings. See, for example, FIGS. 3-6, where FIG. 3 is a photograph of Control A 302, Sample A 304, Sample B 306, and Sample C 308 on a flat surface, FIG. 4 is a photograph of Control A 302, Sample A 304, Sample B 306, and Sample C 308 on a non-flat surface, FIG. 5 is a graphical view of axial force versus displacement for various samples, and FIG. 6 is a photograph of Sample A 304 and Sample C 308 in a rolled configuration. With respect to FIG. 5, a three-point bending test was performed on Samples A 304, B 306, and C 308 using an RSA-G2 Solids Analyzer from TA Instruments to further characterize shingle flexibility. Samples A 304, B 306, and C 308 were subjected to the three-point bending test at a constant rate of 100 microns per second and at a temperature of 20° C. As shown in FIG. 5, the resulting axial force versus displacement, at the breaking point, was plotted for each of the three Samples A 304, B 306, and C 308, with Sample C 308 being the most flexible, which is consistent with FIG. 4. These figures illustrate the improved pliability of the asphalt filled coatings of Sample A 304, Sample B 306, and Sample C 308. In addition, each of the three Samples A 304, B 306, and C 308 exhibited an axial force of less than 25 N at a displacement of up to 10 mm.

What is claimed is:

1. A roofing shingle comprising:
a substrate;
an asphalt filled coating on the substrate,
    wherein the asphalt filled coating comprises:
        an asphalt;
        a polymer modifier;
        50% to 95% by weight of an asphalt shingle waste based on a total weight of the asphalt filled coating; and
        5% by weight or less of at least one virgin filler based on the total weight of the asphalt filled coating; and
granules on the asphalt filled coating.

2. The roofing shingle of claim 1, wherein the asphalt filled coating comprises:
    1% to 49% by weight of the asphalt based on the total weight of the asphalt filled coating; and 1% to 20% by weight of the polymer modifier based on the total weight of the asphalt filled coating.

3. The roofing shingle of claim 1, wherein the asphalt filled coating comprises:
    5% to 50% by weight of the asphalt and the polymer modifier based on the total weight of the asphalt filled coating.

4. The roofing shingle of claim 1, wherein the asphalt filled coating comprises:
    50% to 99% by weight of the asphalt based on a total weight of the asphalt and the polymer modifier; and
    1% to 50% by weight of the polymer modifier based on the total weight of the asphalt and the polymer modifier.

5. The roofing shingle of claim 1, wherein the asphalt filled coating comprises:
    80% to 99% by weight of the asphalt based on a total weight of the asphalt and the polymer modifier; and
    1% to 20% by weight of the polymer modifier based on the total weight of the asphalt and the polymer modifier.

6. The roofing shingle of claim 1, wherein the asphalt comprises an oxidized asphalt.

7. The roofing shingle of claim 1, wherein the polymer modifier comprises at least one of a poly(styrene-butadiene-styrene) (SBS), a poly(styrene-ethylene/butylene-styrene) (SEBS), a poly(styrene-isoprene-styrene) (SIS), an atactic polypropylene (APP), an isotactic polypropylene (IPP), a low-density polyethylene (LDPE), medium-density polyethylene (MDPE), high-density polyethylene (HDPE), a polypropylene, an acrylic, a polyvinyl siloxane (PVS), any copolymer thereof, or any combination thereof.

8. The roofing shingle of claim 1, wherein the asphalt shingle waste comprises:
    5% to 50% by weight of a waste asphalt based on a total weight of the asphalt shingle waste; and
    50% to 95% by weight of a limestone, granules, or impurities based on the total weight of the asphalt shingle waste.

9. The roofing shingle of claim 1, wherein the asphalt filled coating comprises 1% to 5% by weight of the at least one virgin filler based on the total weight of the asphalt filled coating.

10. The roofing shingle of claim 1, wherein the asphalt filled coating is free of the at least one virgin filler.

11. The roofing shingle of claim 1, wherein the roofing shingle exhibits, when tested according to a three-point bending test at a constant rate of 100 microns per second and a temperature of 20° C., an axial force of 25 N or less at a displacement of 0.1 mm to 10 mm.

12. The roofing shingle of claim 1, wherein the roofing shingle exhibits, when tested according to a three-point bending test at a constant rate of 100 microns per second and a temperature of 20° C., an axial force of 2 N to 25 N at a displacement of 0.1 mm to 10 mm.

13. The roofing shingle of claim 1, wherein the asphalt filled coating has a penetration point of 15 dmm to 45 dmm as measured according to ASTM D-5.

14. The roofing shingle of claim 1, wherein the asphalt filled coating has a softening point of 190° F. to 250° F. as measured according to ASTM D-3461.

15. A roofing system comprising:
a roofing substrate; and
at least one roofing shingle,
    wherein the at least one roofing shingle is located on the roofing substrate,
    wherein the at least one roofing shingle comprises:
        a substrate;
        an asphalt filled coating on the substrate, wherein the asphalt filled coating comprises:
- an asphalt;
- a polymer modifier;
- 50% to 95% by weight of an asphalt shingle waste based on a total weight of the asphalt filled coating; and
- 5% by weight or less of at least one virgin filler based on the total weight of the asphalt filled coating; and granules on the asphalt filled coating.

16. The roofing system of claim 15, wherein the roofing substrate comprises at least one of a plywood substrate, a glass substrate, a cellulosic substrate, a roof shingle, a mat, a fabric, a glass mat, a fiberglass mat, an underlayment, a roofing membrane, a roof deck, a photovoltaic (PV) panel, a modified bitumen (MODBIT) substrate, a roll good, a polyisocyanurate (ISO) foam board, a cover board, a pipe, a base sheet, a chimney, a wax paper, or any combination thereof.

17. The roofing system of claim 15, wherein the at least one roofing shingle directly contacts the roofing substrate.

18. The roofing system of claim 15, wherein the asphalt filled coating comprises:
- 1% to 49% by weight of the asphalt based on the total weight of the asphalt filled coating; and
- 1% to 20% by weight of the polymer modifier based on the total weight of the asphalt filled coating.

19. The roofing system of claim 15, wherein the asphalt filled coating is substantially free of the at least one virgin filler.

* * * * *